United States Patent
Koito et al.

(10) Patent No.: US 12,287,543 B2
(45) Date of Patent: Apr. 29, 2025

(54) DISPLAY DEVICE

(71) Applicant: Japan Display Inc., Tokyo (JP)

(72) Inventors: Takeo Koito, Tokyo (JP); Shuji Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/204,502

(22) Filed: Jun. 1, 2023

(65) Prior Publication Data

US 2023/0393428 A1 Dec. 7, 2023

(30) Foreign Application Priority Data

Jun. 3, 2022 (JP) .................................. 2022-091012

(51) Int. Cl.
*G02F 1/1335* (2006.01)
*G02F 1/1343* (2006.01)

(52) U.S. Cl.
CPC .. *G02F 1/133512* (2013.01); *G02F 1/133514* (2013.01); *G02F 1/134345* (2021.01)

(58) Field of Classification Search
CPC .............................................. G02F 1/133512
See application file for complete search history.

(56) References Cited

U.S. PATENT DOCUMENTS

| | | | | |
|---|---|---|---|---|
| 9,817,240 | B2* | 11/2017 | Kwon | G02B 30/25 |
| 2008/0055500 | A1* | 3/2008 | Maeda | G02B 30/27 |
| | | | | 348/E13.03 |
| 2014/0320959 | A1* | 10/2014 | Jun | G02B 1/16 |
| | | | | 359/464 |
| 2015/0301402 | A1* | 10/2015 | Kimura | G06F 3/0412 |
| | | | | 359/891 |

FOREIGN PATENT DOCUMENTS

JP 2009223100 A 10/2009

* cited by examiner

*Primary Examiner* — Edmond C Lau
(74) *Attorney, Agent, or Firm* — K&L Gates LLP

(57) ABSTRACT

According to an aspect, a display device capable of outputting individual images to a plurality of viewpoints arranged in a predetermined direction, the display device includes: two light-transmitting substrates that face each other with a liquid crystal layer interposed therebetween; a resin layer that is a light-transmitting layer and stacked between the liquid crystal layer and one substrate positioned on a user side of the two light-transmitting substrates; and a light-shielding barrier provided between the one substrate and the resin layer and having a plurality of openings.

10 Claims, 26 Drawing Sheets

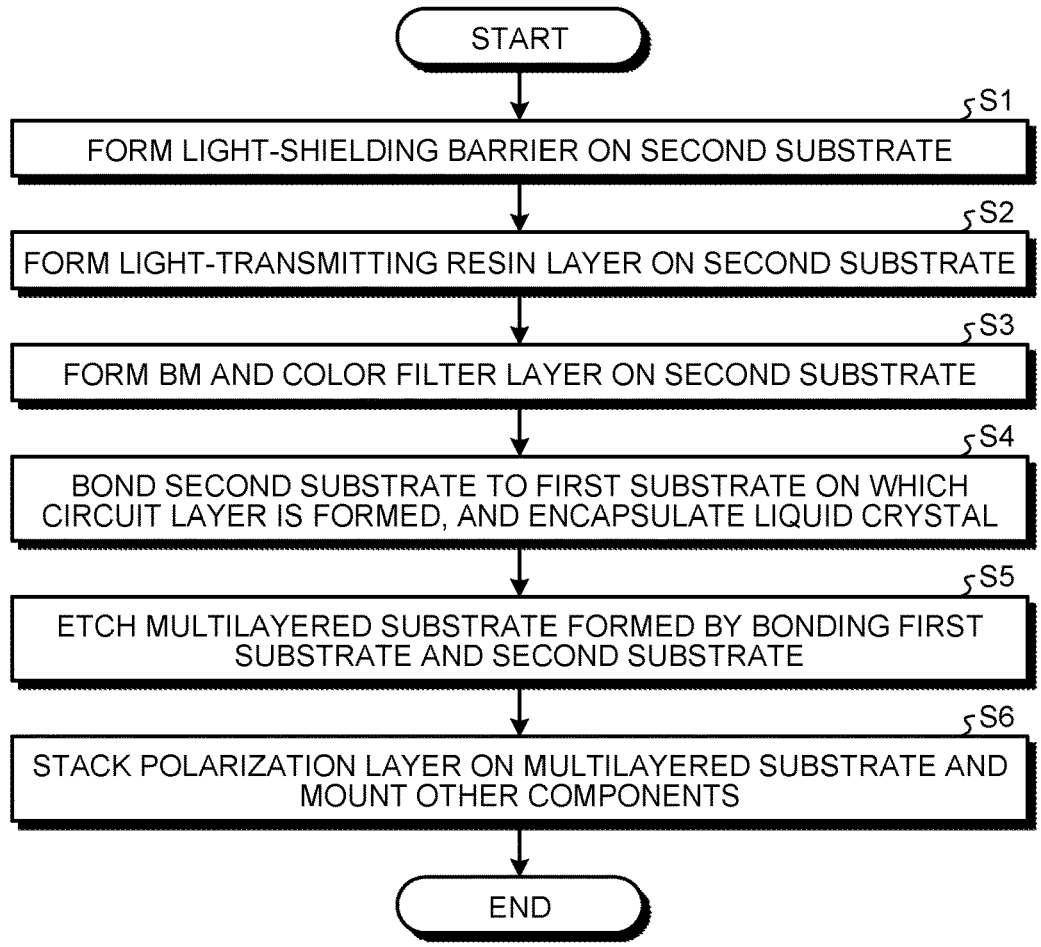
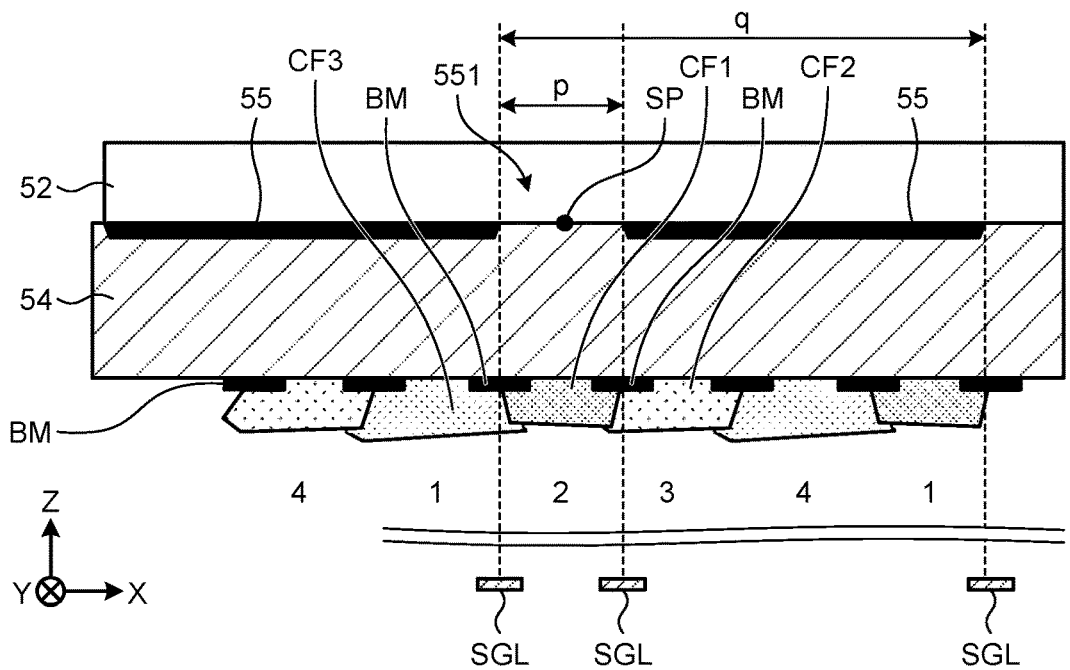

| | SCHEMATIC DIAGRAM |
|---|---|
| ALLOCATION EXAMPLE | Rows n, (n+1), (n+2), (n+3) with repeating pattern 1,2,3,4 across B,R,G,B,R,G,... columns; row n: 1 2 3 4 1 2 3 4 1 2 3 4 1 2 3 4 1 2; row (n+1): 3 4 1 2 3 4 1 2 3 4 1 2 3 4 1 2 3 4; row (n+2): 1 2 3 4 1 2 3 4 1 2 3 4 1 2 3 4 1 2; row (n+3): 3 4 1 2 3 4 1 2 3 4 1 2 3 4 1 2 3 4. Labels: Rpix, Gpix, Bpix. Axes Y up, X right, Z into page. |
| LIGHT-SHIELDING PATTERN | Black field with white slits 551 arranged in staggered rows n, (n+1), (n+2), (n+3); label 55. |
| U2-VIEWPOINT VISIBLE REGION | Columns B R G B R G... Rows n, (n+1), (n+2), (n+3) showing "2" visible through slits 551 on mask 55; labels Rpix, Gpix, Bpix. |

FIG.12

| | SCHEMATIC DIAGRAM |
|---|---|
| COLUMN INVERSION POLARITY | |
| U2-VIEWPOINT VISIBLE REGION | |

FIG.14

| | SCHEMATIC DIAGRAM |
|---|---|
| DOT INVERSION POLARITY | Rows n, (n+1), (n+2), (n+3) with BRG columns showing +/− dot inversion pattern; Rpix, Gpix, Bpix labeled |
| U2-VIEWPOINT VISIBLE REGION | Rows n, (n+1), (n+2), (n+3) with BRG columns showing sparse +/− visible sub-pixels (551, 55); Rpix, Gpix, Bpix labeled |

FIG.15

| | SCHEMATIC DIAGRAM |
|---|---|
| ALLOCATION EXAMPLE | B R G B R G B R G B R G B R G B R G<br>n: 1 2 3 4 1 2 3 4 1 2 3 4 1 2 3 4 1 2<br>(n+1): 3 4 1 2 3 4 1 2 3 4 1 2 3 4 1 2 3 4<br>(n+2): 2 3 4 1 2 3 4 1 2 3 4 1 2 3 4 1 2 3<br>(n+3): 4 1 2 3 4 1 2 3 4 1 2 3 4 1 2 3 4 1<br>Rpix  Gpix  Bpix |
| LIGHT-SHIELDING PATTERN | FA1, 551, 55 (rows n, n+1, n+2, n+3) |
| U2-VIEWPOINT VISIBLE REGION | B R G B R G B R G B R G B R G B R G<br>n, (n+1), (n+2), (n+3) with "2" markers — 551, 55<br>Bpix  Rpix  Gpix |

FIG.17

| | SCHEMATIC DIAGRAM |
|---|---|
| WHITE-OUTPUTTING ALLOCATION EXAMPLE | (white-outputting pixel allocation diagram showing rows n, n+1, n+2, n+3 with B R G columns, pixels labeled 1, 2, 3, W; Rpix, Gpix, Bpix indicated) |
| BLACK-OUTPUTTING ALLOCATION EXAMPLE | (black-outputting pixel allocation diagram showing rows n, n+1, n+2, n+3 with B R G columns, pixels labeled 1, 2, 3, b; Rpix, Gpix, Bpix indicated) |

FIG.20

| | SCHEMATIC DIAGRAM |
|---|---|
| FIVE-VIEWPOINT IMAGE ALLOCATION EXAMPLE 1 | n: 5 1 2 3 4 5 1 2 3 4 5 1 2 3 4 5 1 2<br>(n+1): 2 3 4 5 1 2 3 4 5 1 2 3 4 5 1 2 3 4<br>(n+2): 3 4 5 1 2 3 4 5 1 2 3 4 5 1 2 3 4 5<br>(n+3): 5 1 2 3 4 5 1 2 3 4 5 1 2 3 4 5 1 2<br>(n+3): 1 2 3 4 5 1 2 3 4 5 1 2 3 4 5 1 2 3<br>Columns: B R G B R G B R G B R G B R G B R G<br>Rpix, Gpix, Bpix |
| FIVE-VIEWPOINT IMAGE ALLOCATION EXAMPLE 2 | n: 2 3 4 5 1 2 3 4 5 1 2 3 4 5 1 2 3 4<br>(n+1): 4 5 1 2 3 4 5 1 2 3 4 5 1 2 3 4 4 1<br>(n+2): 1 2 3 4 5 1 2 3 4 5 1 2 3 4 5 1 2 3<br>(n+3): 3 4 5 1 2 3 4 5 1 2 3 4 5 1 2 3 4 5<br>(n+3): 5 1 2 3 4 5 1 2 3 4 5 1 2 3 4 5 1 2<br>Columns: G B R G B R G B R G B R G B R G B R<br>Rpix, Gpix, Bpix |

FIG.22

| | SCHEMATIC DIAGRAM |
|---|---|
| FOUR-SUB-PIXEL/ TWO-VIEWPOINT ALLOCATION EXAMPLE | |
| SECOND-VIEWPOINT VISIBLE REGION | |

| | SCHEMATIC DIAGRAM |
|---|---|
| FOUR-SUB-PIXEL/ FOUR-VIEWPOINT ALLOCATION EXAMPLE | |
| SECOND-VIEWPOINT VISIBLE REGION | |

FIG.26

| | SCHEMATIC DIAGRAM |
|---|---|
| FOUR-SUB-PIXEL/FIVE-VIEWPOINT ALLOCATION EXAMPLE 2 | (pixel allocation grid with rows n through n+5, columns labeled R G B W R G B W R G B W R G B W R G, with values 1-5 assigned; Rpix, Wpix, Bpix, Gpix labeled at bottom) |
| SECOND-VIEWPOINT VISIBLE REGION | (visible region diagram showing "2" values at second viewpoint positions; labels 551, 55; Gpix, Bpix, Wpix, Rpix at bottom) |

FIG.27

DISPLAY DEVICE

CROSS-REFERENCE TO RELATED APPLICATION

This application claims the benefit of priority from Japanese Patent Application No. 2022-091012 filed on Jun. 3, 2022, the entire contents of which are incorporated herein by reference.

BACKGROUND

1. Technical Field

What is disclosed herein relates to a display device.

2. Description of the Related Art

As described in Japanese Patent Application Laid-open Publication No. 2009-223100 (JP-A-2009-223100), a display device capable of outputting individual images to a plurality of viewpoints by restricting lines of light reaching the viewpoints with a light-shielding barrier has been known.

When individual images are output to a plurality of viewpoints, the angles of lines of light reaching the respective viewpoints from the display device are different from each other. The distance between a liquid crystal layer sealed between two glass substrates in the display device and a light-shielding barrier corresponds to the angle difference between viewpoints adjacent to each other in a predetermined direction and the arrangement pitch of sub pixels used to output individual images in the predetermined direction. With the configuration disclosed in JP-A-2009-223100, it is extremely difficult to satisfy a requested distance between the liquid crystal layer and the light-shielding barrier, depending on the angle difference and the arrangement pitch. Specifically, since the glass substrate exists between the liquid crystal layer and the light-shielding barrier in the configuration disclosed in JP-A-2009-223100, the thickness of the glass substrate needs to be less than the requested distance, but this is technologically difficult. Recently, the arrangement pitch of sub pixels has become smaller as the resolution of display devices has become higher, and thus it is not easy to reduce the thickness of the glass substrate in accordance with such a trend in the arrangement pitch of sub pixels.

For the foregoing reasons, there is a need for a display device in which the distance between a liquid crystal layer and a light-shielding barrier can be more easily set to a desired thickness.

SUMMARY

According to an aspect, a display device capable of outputting individual images to a plurality of viewpoints arranged in a predetermined direction, the display device includes: two light-transmitting substrates that face each other with a liquid crystal layer interposed therebetween; a resin layer that is a light-transmitting layer and stacked between the liquid crystal layer and one substrate positioned on a user side of the two light-transmitting substrates; and a light-shielding barrier provided between the one substrate and the resin layer and having a plurality of openings.

BRIEF DESCRIPTION OF THE DRAWINGS

FIG. 5 is a flowchart illustrating exemplary procedures of manufacturing the display device;

FIG. 6 is a schematic diagram illustrating the relation between a sub-pixel pitch and a barrier pitch;

FIG. 9 is a diagram illustrating visible regions made up of the sub pixels visually recognizable at viewpoints U2, U1, and U3;

FIG. 10 is a diagram illustrating the correspondence relation between a pixel signal allocation example, a light-shielding pattern, and a visible region at the viewpoint U2;

FIG. 12 is a diagram illustrating the correspondence relation between the polarity of each sub pixel and a visible region at the viewpoint U2 when a column inversion drive system is employed;

FIG. 14 is a diagram illustrating the correspondence relation between the polarity of each sub pixel and a visible region at the viewpoint U2 when a dot inversion drive system is employed;

FIG. 15 is a diagram illustrating the correspondence relation between a pixel signal allocation example, a light-shielding pattern, and a visible region at the viewpoint U2 in a first modification;

FIG. 17 is a diagram illustrating a pixel signal allocation example in a second modification;

FIG. 20 is a diagram illustrating a pixel signal allocation example in a fourth modification;

FIG. 22 is a diagram illustrating a pixel signal allocation example in a four-sub-pixel/two-viewpoint case and a visible region made up of sub pixels visually recognizable at a second viewpoint as one of the two viewpoints;

FIG. 23 is a diagram illustrating a pixel signal allocation example in a four-sub-pixel/three-viewpoint case and a visible region made up of sub pixels visually recognizable at a second viewpoint as one of the three viewpoints;

FIG. 24 is a diagram illustrating a pixel signal allocation example in a four-sub-pixel/four-viewpoint case and a visible region made up of sub pixels visually recognizable at a second viewpoint as one of the four viewpoints;

FIG. 26 is a diagram illustrating a pixel signal allocation example in a four-sub-pixel/five-viewpoint case and a visible region made up of sub pixels visually recognizable at a second viewpoint as one of the five viewpoints;

FIG. 27 is a diagram illustrating a pixel signal allocation example in a 2×2-sub-pixel/two-viewpoint case and a visible region made up of sub pixels visually recognizable at a second viewpoint as one of the two viewpoints;

DETAILED DESCRIPTION

An embodiment of the present disclosure is described below with reference to the drawings. What is disclosed herein is only an example, and any changes that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

In this disclosure, when an element is described as being "on" another element, the element can be directly on the other element, or there can be one or more elements between the element and the other element.

Figure 1:
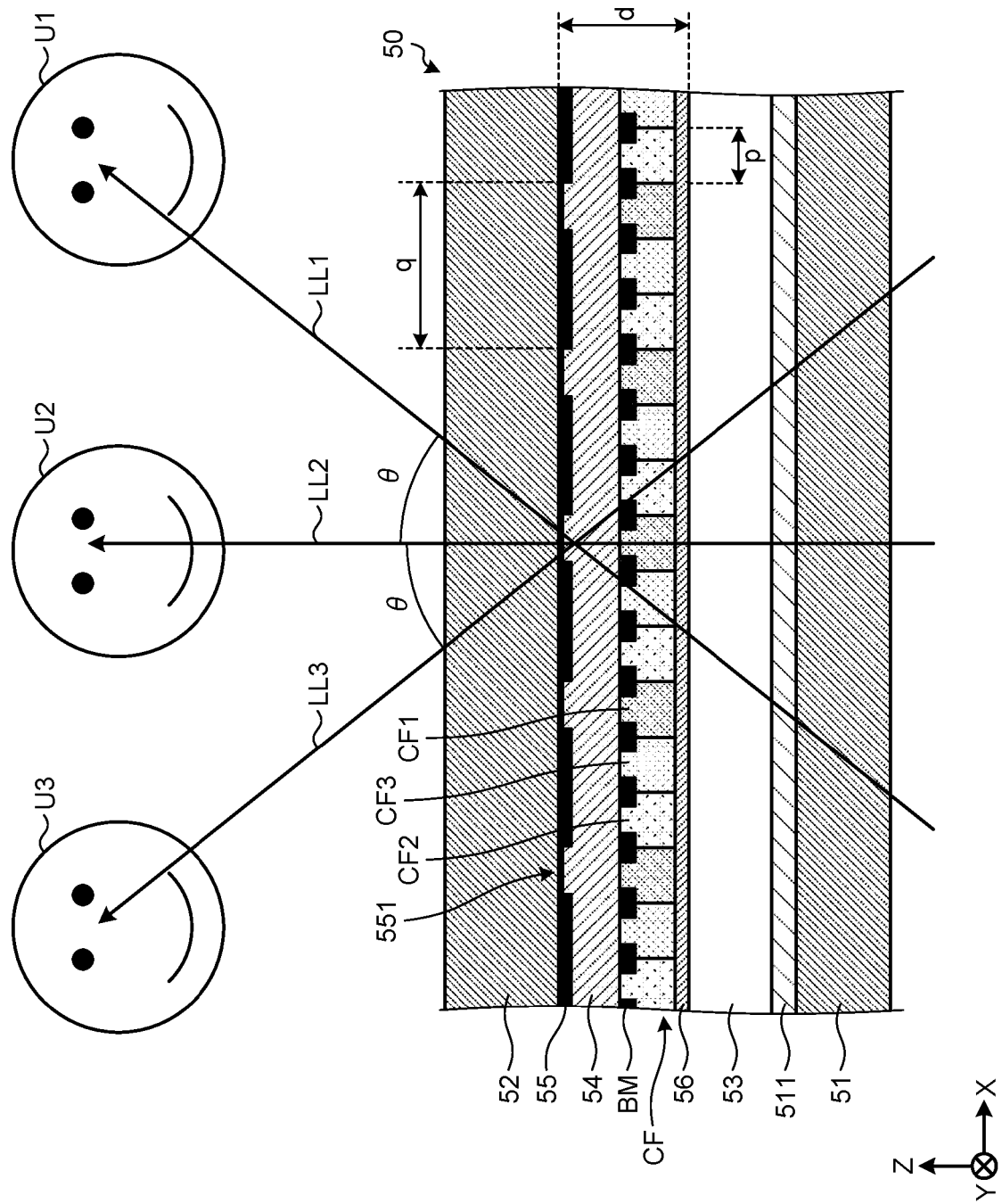
FIG. 1 is a sectional view illustrating a main configuration of a display device.

FIG. 1 is a sectional view illustrating a main configuration of a display device 50. The display device 50 includes a first substrate 51 and a second substrate 52.

The first substrate 51 and the second substrate 52 are light-transmitting substrates. The first substrate 51 and the second substrate 52 are glass substrates but may be resin substrates. The first substrate 51 and the second substrate 52 face each other with a liquid crystal layer 53 interposed therebetween.

Hereinafter, a direction in which the first substrate 51 and the second substrate 52 face each other is defined as a Z direction. In addition, one of two directions along a plane orthogonal to the Z direction is defined as an X direction, and the other direction is defined as a Y direction. The X direction and the Y direction are orthogonal to each other.

A circuit formation layer 511 is stacked on a surface of the first substrate 51 on the liquid crystal layer 53 side. The circuit formation layer 511 includes a plurality of components such as pixel electrodes respectively provided for sub pixels, a common electrode shared by the sub pixels, switching elements coupled to the pixel electrodes, wiring lines (for example, signal lines SGL illustrated in FIG. 6 to be described later) coupling the switching elements and a non-illustrated driver circuit of the display device 50, and an insulating layer that insulates any places to be insulated among these components. The circuit formation layer 511 includes a plurality of layers stacked to form the components. Each sub pixel is, for example, any of a first sub pixel Rpix, a second sub pixel Gpix, and a third sub pixel Bpix to be described later. The first, second, and third sub pixels Rpix, Gpix, and Bpix are collectively referred to as sub pixels unless otherwise stated. In modifications, a fourth sub pixel Wpix may be additionally included in sub pixels in some cases. The sub pixels are not limited to these specific sub pixels but are provided as appropriate in accordance with the color of light allowed to pass through a color filter.

A light-shielding barrier 55, a resin layer 54, a black matrix BM, a color filter layer CF, and an overcoat (OC) layer 56 are stacked on a surface of the second substrate 52 on the liquid crystal layer 53 side.

The light-shielding barrier 55 is a light-shielding layer provided with a plurality of openings 551 each having a predetermined size and arranged at predetermined intervals in the X and Y directions. Each opening 551 is a hole penetrating through the light-shielding barrier 55 in the Z direction. Light through the color filter layer CF passes through the openings 551. Disposition of the openings 551 will be described later.

The resin layer 54 is a light-transmitting resin layer. Specifically, the resin layer 54 is formed by, for example, applying a colorless resist but may be formed by attaching a resist film. The resin layer 54 may be formed by using an application method such as spin coating slit or spin-slit coating. The material of the resin layer 54 is, for example, a light-transmitting resin such as acrylic or polyimide-based light-transmitting resin but not limited thereto and may be another light-transmitting resin that functions in a similar manner.

The color filter layer CF includes a plurality of kinds of color filters (for example, a first color filter CF1, a second color filter CF2, and a third color filter CF3). The first color filter CF1 transmits light in the wavelength band of a first color (for example, red (R)) and blocks or absorbs light in the other wavelength bands. The second color filter CF2 transmits light in the wavelength band of a second color (for example, green (G)) and blocks or absorbs light in the other wavelength bands. The third color filter CF3 transmits light in the wavelength band of a third color (for example, blue (B)) and blocks or absorbs light in the other wavelength bands. In a plan-view viewpoint, the color filters are partitioned by the black matrix BM in a lattice shape. The plan-view viewpoint is a viewpoint corresponding a plan view of a plane (X-Y plane) orthogonal to the Z direction. The black matrix BM blocks light. The OC layer 56 is a light-transmitting resin layer interposed between the color filter layer CF and the liquid crystal layer 53 to protect the color filter layer CF.

The plurality of kinds of color filters included in the color filter layer CF may include some of the first color filter CF1, the second color filter CF2, and the third color filter CF3 and/or may include any other color filter different from the first color filter CF1, the second color filter CF2, and the third color filter CF3. The color filter layer CF may additionally include a light transmission part provided with a colorless filter or no filter. The color filter layer CF may additionally include a light-shielding part that blocks light (refer to a "black-outputting allocation example" in FIG. 17). The light-shielding part may be formed as an extension of the black matrix BM or may be provided as a member separate from the black matrix BM.

The display device 50 displays images that are different when viewed at a plurality of viewpoints arranged in the X direction. FIG. 1 schematically illustrates a state in which different images are displayed and outputted to respective viewpoints U1, U2, and U3 arranged in the X direction. Light line LL1 schematically illustrates the line of light extending from an image to be visually recognized at the viewpoint U1. Light line LL2 schematically illustrates the line of light extending from an image to be visually recognized at the viewpoint U2. Light line LL3 schematically illustrates the line of light extending from an image to be visually recognized at the viewpoint U3.

The emission angles of two lines of light toward two respective viewpoints adjacent to each other in the X direction among the plurality of viewpoints are different from each other by an angle θ. FIG. 1 exemplifies a case in which light line LL2 is aligned with the Z direction, light line LL1 is tilted to one side in the X direction at the angle θ relative to the Z direction, and light line LL3 is tilted to the other side in the X direction at the angle θ relative to the Z direction. The angle θ is, for example, 35° but not limited thereto and is changeable as appropriate.

Although not illustrated, a light source configured to emit light toward at least the display device 50 is provided on a side opposite to the viewpoints U1, U2, and U3 with respect to the display device 50. The light source emits light illustrated with light lines LL1, LL2, and LL3.

The arrangement pitch of the plurality of kinds of color filters included in the color filter layer CF in the X direction is a sub-pixel pitch p. The arrangement pitch of regions in the X direction, each region including one of two openings 551 adjacent to each other in the X direction and the light-shielding barrier 55 positioned between the two openings 551, is a barrier pitch q. Hereinafter, the pitch of the openings 551 means the arrangement pitch of the regions, which is the barrier pitch q. The distance in the Z direction between one surface of the second substrate 52 on a side on which the light-shielding barrier 55 is provided and one surface of the OC layer 56 contacting the liquid crystal layer 53 is a distance d. In this example, the openings 551 are filled with the resin layer 54, and the thickness of the resin layer 54 includes the thickness of the light-shielding barrier 55 in the Z direction.

The distance d corresponds to the magnitude of the angle θ and the arrangement pitch of sub pixels in the X direction, in other words, the sub-pixel pitch p. The distance d can be expressed by Expression (1) below. In Expression (1), "tan" means tangent. In Expression (1), "a sin" means arcsin. In Expression (1), "sin" means sine. In Expression (1), "n" is a coefficient (for example, 1.5) corresponding to the difference between the optical refractive index of the display device 50 and the optical refractive index of air between the display device 50 and a viewpoint (for example, the viewpoint U1, U2, or U3). In Expression (1), "p" is the value of the sub-pixel pitch p. In Expression (1), "θ" is the value of the angle θ.

$$d = p/\tan(a\sin(\sin\theta/n)) \quad (1)$$

The sub-pixel pitch p can be expressed by Expression (2) below. In Expression (2), "ppi" is the resolution of the display device 50. The resolution is the number of pixels. The value of m is the number of sub pixels included in each pixel. For example, the display device 50 including the first color filter CF1, the second color filter CF2, and the third color filter CF3 as illustrated in FIG. 1 includes the first sub pixel Rpix, the second sub pixel Gpix, and the third sub pixel Bpix (refer to FIG. 7, for example), as the sub pixels. In this case, m is three. The distance d expressed by Expression (1) and the sub-pixel pitch p expressed by Expression (2) are in micrometers (μm).

$$p = 25.4 \times 1000/ppi \times m \quad (2)$$

The thickness (in units of μm) in the Z direction, which is expressed by the value (d) of the distance d that can be expressed as (1) above, is close to or smaller than 100 depending on the combination of the value (θ) of the angle θ and the value (p) of the sub-pixel pitch p. For example, in the case of ppi=200 and m=3, p is 42.3 approximately. In the case of p=42.3 and θ=35, d is 102.3 approximately. In the case of ppi=300 and m=3, p is 28.2 approximately. In the case of p=28.2 and θ=35, d is 68.2 approximately. The value of d decreases as θ increases. For example, θ may be 70 when the number of users visually recognizing individual images (the number of viewpoints) is two.

When no resin layer 54 is provided, the light-shielding barrier 55 positioned between the resin layer 54 and the second substrate 52 in FIG. 1 needs to be provided on a surface (display surface) on the viewpoint side, in other words, on the second substrate 52, and the value of the thickness of a multilayered structure including the second substrate 52, the color filter layer CF, and the OC layer 56 in the Z direction needs to be set to a value equal to the value of the distance d. The thicknesses of the color filter layer CF and the OC layer 56 are typically 1 to 2 μm. However, it is technologically difficult to set the thickness of the second substrate 52 to 100 μm approximately. In particular, it is extremely difficult to set the thickness of the second substrate 52 to a value smaller than 100 μm.

Thus, in the embodiment, the resin layer 54 is provided between the second substrate 52 and the liquid crystal layer 53, and the light-shielding barrier 55 is provided between the second substrate 52 and the resin layer 54, whereby the distance d increases by the thickness of the resin layer 54 in the Z direction and can be prevented from being affected by the thickness of the second substrate 52. Thus, the requested distance d can be easily achieved.

Figure 2:
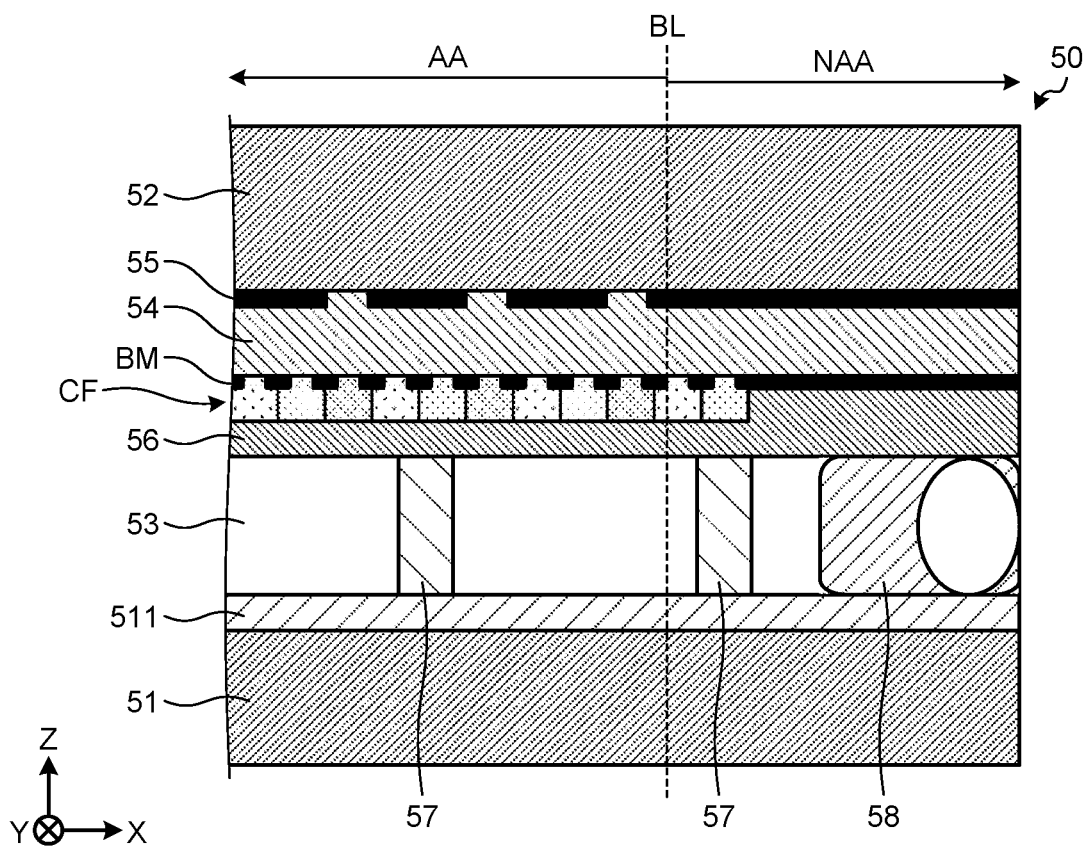
FIG. 2 is a schematic diagram illustrating an exemplary structure for sealing a liquid crystal layer.
Figure 3:
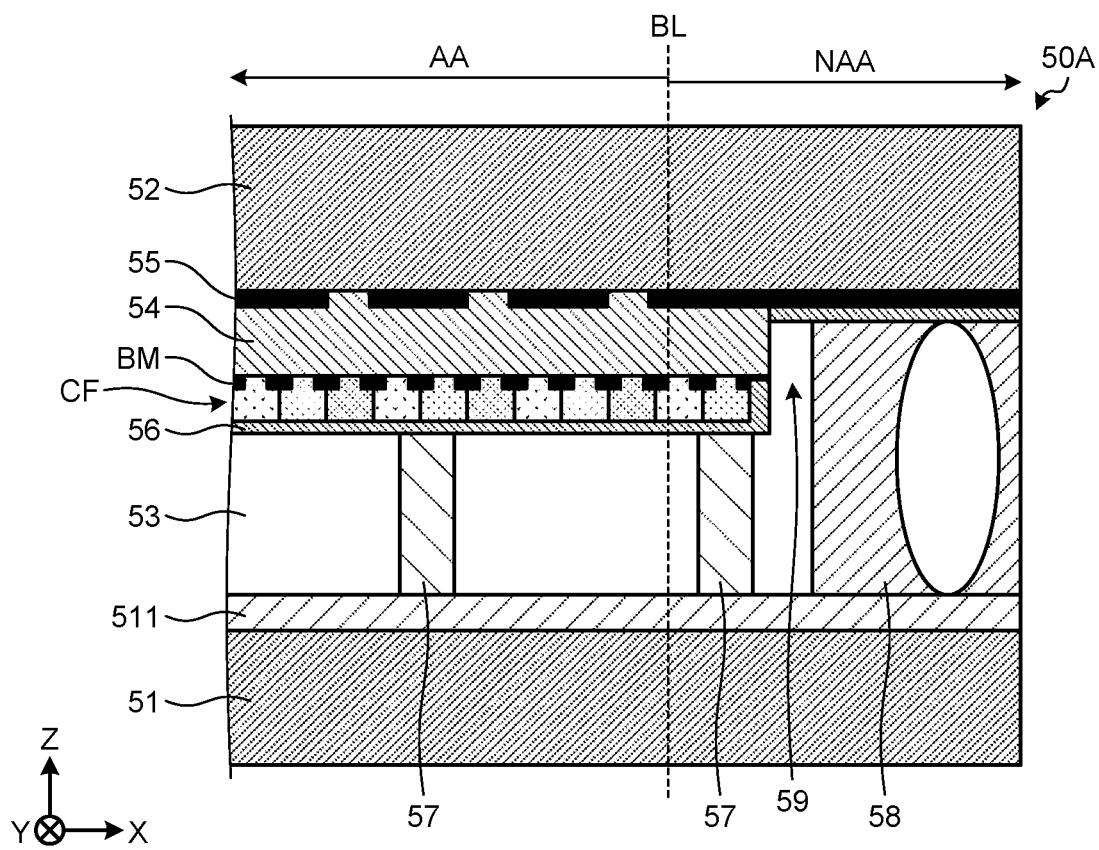
FIG. 3 is a schematic diagram illustrating an exemplary structure for sealing the liquid crystal layer.
Figure 4:
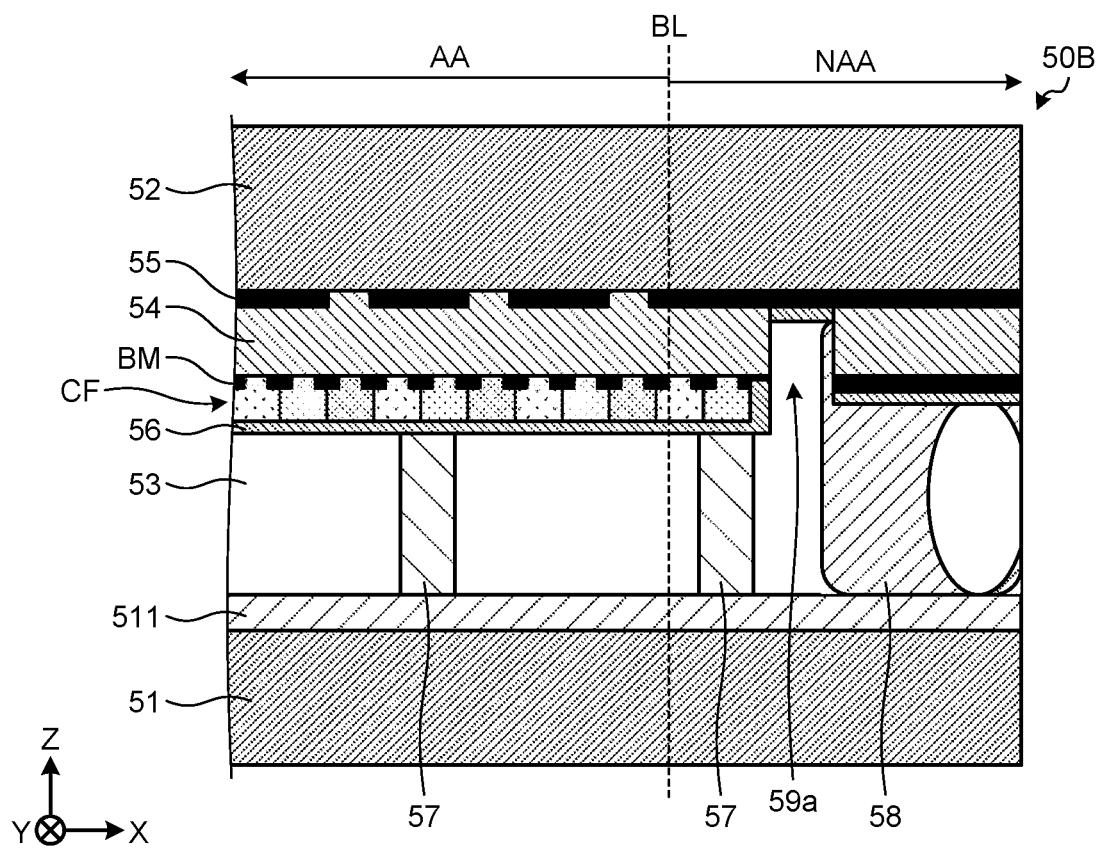
FIG. 4 is a schematic diagram illustrating an exemplary structure for sealing the liquid crystal layer.

FIG. 2 is a schematic diagram illustrating an exemplary structure for sealing the liquid crystal layer 53. As illustrated in FIG. 2 and other drawings, a sealing member 58 is provided at an end part of the display device 50. The sealing member 58 is interposed between the circuit formation layer 511 stacked on the first substrate 51 and the OC layer 56 stacked on the second substrate 52. The sealing member 58 is provided along the outer periphery of the display device 50 in plan view so as to surround the liquid crystal layer 53 and seals the liquid crystal layer 53. FIG. 2 and FIGS. 3 and 4 to be described later exemplify one end in the X direction among end parts of the display device 50, but the same structure is provided at the other end part in the X direction and both end parts in the Y direction.

The sealing member 58 is provided in a non-display region NAA. The non-display region NAA surrounds a display region AA along the outer periphery of the display device 50 in plan view. The non-display region NAA is not used for image display outputting. The display region AA is used for image display outputting. In FIG. 2 and other drawings, a boundary line BL between the non-display region NAA and the display region AA is illustrated with a dashed line.

As illustrated in FIG. 2 and other drawings, spacers 57 are provided at places between the circuit formation layer 511 and the OC layer 56 between which the liquid crystal layer 53 is sealed. With the spacers 57, the distance (cell gap) between the circuit formation layer 511 and the OC layer 56 in the Z direction is held to a predetermined distance.

The structure for sealing the liquid crystal layer 53 is not limited to that described above with reference to FIG. 2. Other exemplary structures for sealing the liquid crystal layer 53 will be described below with reference to FIGS. 3 and 4. A display device 50A in FIG. 3 and a display device 50B in FIG. 4 have the same configuration as the display device 50 except that the structure for sealing the liquid crystal layer 53 is different from that in FIG. 2.

FIG. 3 is a schematic diagram illustrating an exemplary structure for sealing the liquid crystal layer 53. As illustrated in FIG. 3, no resin layer 54 nor color filter layer CF may be provided at and near the end part of the display device 50 at which the sealing member 58 is provided. FIG. 3 illustrates a stepped part 59 formed because no resin layer 54 nor color filter layer CF are provided at and near the end part. As illustrated in FIG. 3, a corner of the color filter layer CF on the stepped part 59 side is covered by the OC layer 56. As illustrated in FIG. 3, a corner of the resin layer 54 on the stepped part 59 side may contact the liquid crystal layer 53.

FIG. 4 is a schematic diagram illustrating an exemplary structure for sealing the liquid crystal layer 53. As illustrated in FIG. 4, the resin layer 54 may be provided on the sealing member 58 side with a stepped part 59a interposed. No resin layer 54 nor color filter layer CF is provided at the stepped part 59a, but part of the sealing member 58 extends into the stepped part 59a. No color filter layer CF is provided but the resin layer 54 is provided in most of an area in which the sealing member 58 is provided closer to an end part of the display device 50B than the stepped part 59a.

FIG. 5 is a flowchart illustrating exemplary procedures of manufacturing the display device 50. The light-shielding barrier 55 is formed on the second substrate 52 (step S1). In the process at step S1, the openings 551 of the light-shielding barrier 55 are formed as well. The resin layer 54 is formed on the second substrate 52 subjected to the process at step S1 (step S2). The black matrix BM and the color filter layer CF are formed on the second substrate 52 subjected to the process at step S2 (step S3).

After the process at step S3, the second substrate 52 is bonded to the first substrate 51 on which the circuit formation layer 511 is formed, and the liquid crystal layer 53 is enclosed (step S4). The sealing member 58 is provided to the display device 50 in the process at step S4. Stacking of the circuit formation layer 511 on the first substrate 51 may be performed in parallel to the processes at steps S1 to S3 or may be performed before or after any of the processes at steps S1 to S3.

After the process at step S4, a multilayered substrate formed by bonding the first substrate 51 and the second substrate 52 is etched (thinned) (step S5). After the process at step S5, stacking of a polarization layer on the multilayered substrate and mounting of any other component (step S6) are performed to complete the manufacturing of the display device 50.

FIG. 6 is a schematic diagram illustrating the relation between the sub-pixel pitch p and the barrier pitch q. A point SP illustrated in FIG. 6 and other drawings is the central position of the display region AA (refer to FIG. 2, for example) in the X direction. The opening width of each opening 551 in the X direction is equal to or substantially equal to the sub-pixel pitch p. The barrier pitch q in the X direction is less than k times the sub-pixel pitch p. The value of k is the number of (kinds of) images simultaneously output from the display device 50 and is basically equal to the number of viewpoints defined in advance. One of the k kinds of images is visually recognizable at each of the viewpoints (for example, the viewpoints U1, U2, and U3), and the images visually recognizable at the viewpoints are different from one another. The number k is a natural number equal to two or larger.

FIG. 6 exemplifies a case of k=4. Numbers 1, 2, 3, and 4 provided below the color filter layer CF correspond to numbers "1", "2", "3", and "4" provided to the sub pixels in FIG. 7 and other drawings to be described later. The signal lines SGL illustrated in FIG. 6 are included in the circuit formation layer 511. In the example illustrated in FIG. 6, the position of the signal line SGL in the X direction corresponds to the position of the black matrix BM in the X direction.

The barrier pitch q is set to be less than k times the sub-pixel pitch p so that one color filter (one sub pixel) among the color filters (sub pixels) arranged in the X direction is visually recognizable at each of the viewpoints defined in advance through the corresponding opening 551. In other words, the barrier pitch q needs to be less than k times the sub-pixel pitch p in order to prevent light passing through a plurality of kinds of color filters from being included in light reaching each viewpoint through one opening 551. Thus, when the opening width of each opening 551 in the X direction is equal to the sub-pixel pitch p, the X directional width of a light-shielding region between two openings 551 in the one light-shielding barrier 55 arranged in the X direction (hereinafter referred to as the X directional width of a light-shielding region) is less than (k−1) times the sub-pixel pitch p.

Hereinafter, the expression of a "region in which about r sub pixels are arranged and that is covered by the light-shielding barrier 55" refers to a configuration in which the width of the light-shielding region in the X direction is slightly less than (k−1) times the sub-pixel pitch p since the barrier pitch q is less than k times the sub-pixel pitch p as described above with reference to FIG. 6. The number r is a natural number (r=k−1) obtained by subtracting one from the number (k) of viewpoints. Specifically, "about r sub pixels" in the expression of the "region in which about r sub pixels are arranged and that is covered by the light-shielding barrier 55" means that the width of the light-shielding region in the X direction is not precisely "equal to the width of r sub pixels" but is "smaller than the width of r sub pixels".

Figure 7:
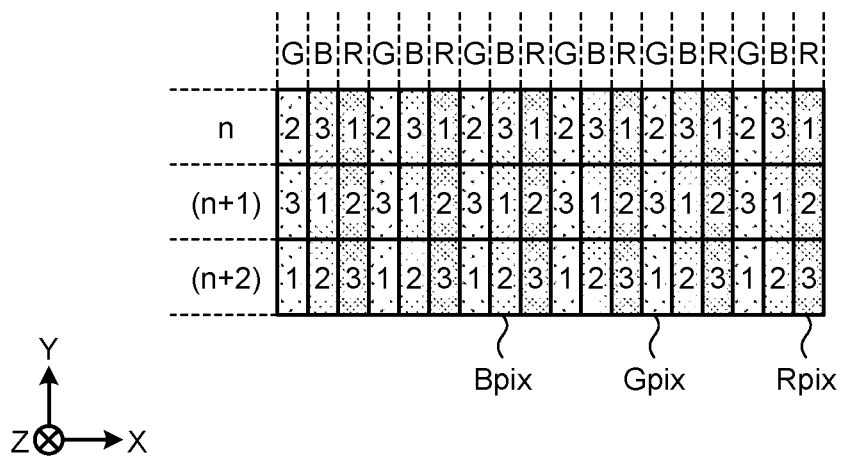
FIG. 7 is a diagram illustrating the relation between an arrangement of sub pixels and numbers indicating users visually recognizing the sub pixels.
Figure 8:
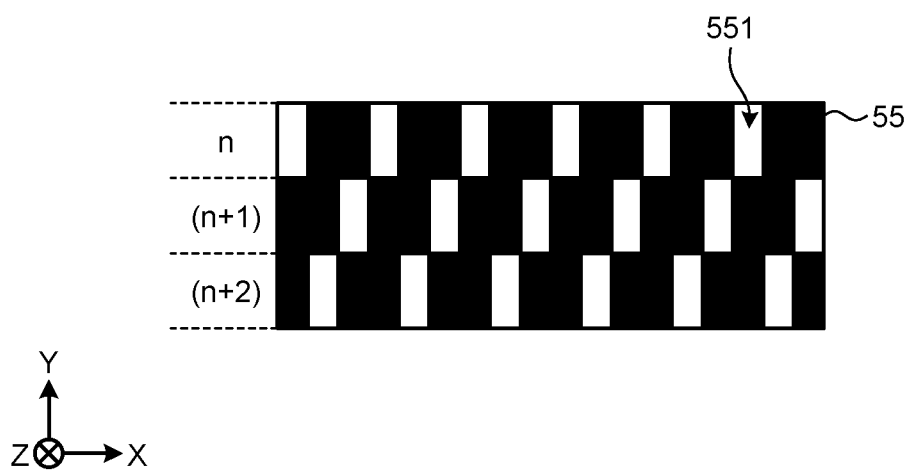
FIG. 8 is a diagram illustrating exemplary positions of openings provided in a light-shielding barrier.
Figure 9:
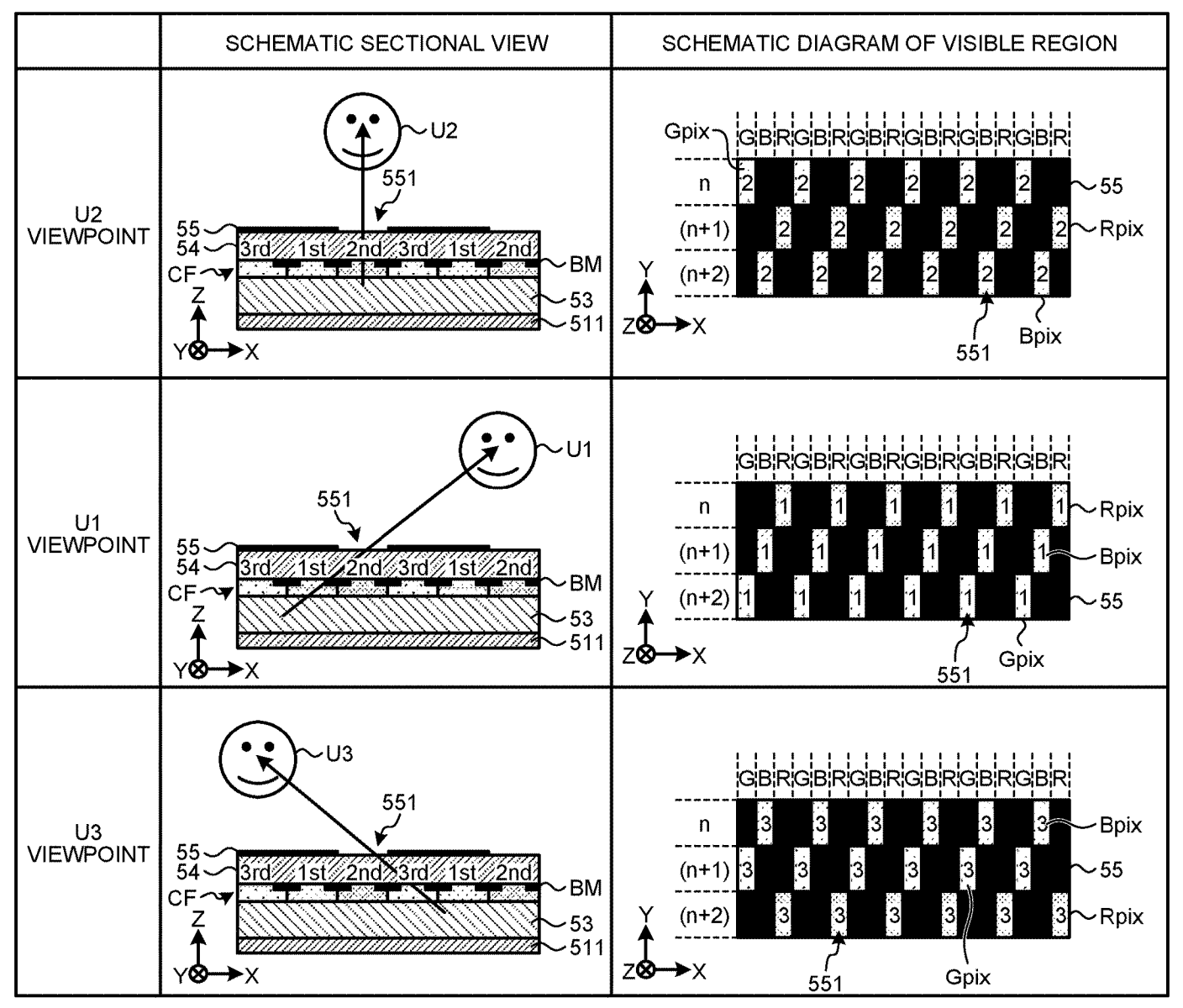

The following describes, with reference to FIGS. 7, 8, and 9, a mechanism of individually outputting a plurality of images in accordance with combination of the colors of light transmitted through the color filter layer CF and light-passing positions restricted by the light-shielding barrier 55 and the openings 551.

FIG. 7 is a diagram illustrating the relation between an arrangement of the sub pixels and numbers indicating users visually recognizing the sub pixels. The first sub pixel Rpix corresponds to the first color filter CF1 positioned on the line of light visually recognized by a user (for example, any of the viewpoints U1, U2, and U3). The second sub pixel Gpix corresponds to the second color filter CF2 positioned on the line of light visually recognized by a user (for example, any of the viewpoints U1, U2, and U3). The third sub pixel Bpix corresponds to the third color filter CF3 positioned on the line of light visually recognized by a user (for example, any of the viewpoints U1, U2, and U3). In FIG. 7 and other drawings illustrating the arrangement of the sub pixels and numbers indicating the users visually recognizing the respective sub pixels, the reference sign of Rpix for the first sub pixel is assigned to only one rectangular region, the reference sign of Gpix for the second sub pixel is assigned to another one rectangular region, and the reference sign of Bpix for the third sub pixel is assigned to another one rectangular region. However, each rectangular region illustrated with the same dot pattern can be assigned the same reference sign.

Sub-pixel rows n, (n+1), and (n+2) illustrated in FIG. 7 and other drawings are three sub-pixel rows arranged in the Y direction, which are selected from among a plurality of sub-pixel rows included in the display device 50. Hereinafter, a row means a sub-pixel row unless otherwise stated. The first sub pixel Rpix, the second sub pixel Gpix, and the third sub pixel Bpix are periodically arranged in each row in the X direction. In FIG. 7, the sub pixels are periodically arranged in the order of the second sub pixel Gpix, the third sub pixel Bpix, and the first sub pixel Rpix from one side of each row in the X direction toward the other side, but this arrangement order is merely exemplary and not restrictive and thus is changeable as appropriate. In FIG. 7 and other drawings, a sub-pixel column in which the second sub pixel Gpix is arranged in the Y direction is denoted by "G" on one side. A sub-pixel column in which the third sub pixel Bpix is arranged in the Y direction is denoted by "B" on the one side. A sub-pixel column in which the first sub pixel Rpix is arranged in the Y direction is denoted by "R" on the one side. Hereinafter, a column means a sub-pixel column unless otherwise stated.

Pixel signals based on image data that is input from the outside to the display device 50 are provided to the sub pixels, and the degrees of light transmitted through the sub pixels are controlled in accordance with gradation values indicated by the pixel signals, whereby an image is displayed and outputted.

Specifically, the degree of light transmitted through the sub pixel corresponds to the orientation of liquid crystal molecules included in the liquid crystal layer 53. The orientation of liquid crystal molecules included in the liquid crystal layer 53 is controlled in accordance with the potential difference between the pixel electrode and the common electrode included in the circuit formation layer 511. The pixel electrode is individually provided for each sub pixel. The common electrode shared by the sub pixels. The pixel signal is individually provided to each pixel electrode to set the potential of the pixel electrode in accordance with the strength of the pixel signal. Thus, the orientation of liquid crystal molecules between the pixel electrode of each sub pixel and the color filter layer CF is controlled.

In FIG. 7 and other drawings, a sub pixel positioned on the line of light (for example, light line LL1 illustrated in FIG. 1) visually recognized at the viewpoint U1 is denoted by "1". A sub pixel positioned on the line of light (for example, light line LL2 illustrated in FIG. 1) visually recognized at the viewpoint U2 is denoted by "2". A sub pixel positioned on the line of light (for example, light line LL3 illustrated in FIG. 1) visually recognized at the viewpoint U3 is denoted by "3".

FIG. 8 is a diagram illustrating exemplary positions of the openings 551 provided in the light-shielding barrier 55. In the light-shielding barrier 55 illustrated in FIG. 8, an opening 551 corresponding to one sub pixel is provided in each region in which three sub pixels are continuously arranged in the X direction in terms of the number of arranged sub pixels illustrated in FIG. 7. In other words, light in a region corresponding to two sub pixels in a region in which three sub pixels are continuously arranged is blocked by the light-shielding barrier 55, and light corresponding to the remaining one sub pixel reaches a user (for example, the viewpoint U1, U2, or U3) through the corresponding opening 551 (refer to FIG. 1). More specifically, as illustrated in FIG. 1, for example, when the display device equipped with the light-shielding barrier 55 is visually recognized by a second user at the viewpoint U2, the sub pixels denoted by "2" in FIG. 7 are mainly visually recognized by the second user through the corresponding openings 551 of the light-shielding barrier 55, and one image (image for the viewpoint U2) is formed by the group of sub pixels denoted by "2". When the display device equipped with the light-shielding barrier 55 is simultaneously visually recognized by a first user at the viewpoint U1 illustrated in FIG. 1, sub pixels denoted by "1" in FIG. 7 are mainly visually recognized by the first user through the corresponding openings 551 of the light-shielding barrier 55, and one image (image for the viewpoint U1) is formed by the group of sub pixel denoted by "1". When the display device equipped with the light-shielding barrier 55 is simultaneously visually recognized by a third user at the viewpoint U3 illustrated in FIG. 1, sub pixels denoted by "3" in FIG. 7 are mainly visually recognized by the third user through the corresponding openings 551 of the light-shielding barrier 55, and one image (image for the viewpoint U3) is formed by the group of sub pixels denoted by "3".

The openings 551 in each row are arranged at regular intervals. Specifically, a region in which about two sub pixels are arranged in the X direction is covered by the light-shielding barrier 55, a region in which one sub pixel is disposed in the X direction is formed as an opening 551, and these regions are alternately arranged in the X direction for each row. The position of each opening 551 provided in the n-th row is shifted by one sub pixel in the negative X direction from the position of the corresponding opening 551 provided in the (n+1)th row. The position of each opening 551 provided in the (n+1)th row is shifted by one sub pixel in the negative X direction from the position of the corresponding opening 551 provided in the (n+2)th row. The position of each opening 551 provided in the (n+2)th row is shifted by two sub pixels in the negative X direction from the position of the corresponding opening 551 provided in the n-th row.

FIG. 9 is a diagram illustrating visible regions made up of the sub pixels visually recognizable at the viewpoints U2, U1, and U3. The viewpoint U2 is a viewpoint when the display device 50 is viewed from the viewpoint U2 illustrated in FIG. 1. The viewpoint U1 is a viewpoint when the display device 50 is viewed from the viewpoint U1 illustrated in FIG. 1. The viewpoint U3 is a viewpoint when the display device 50 is viewed from the viewpoint U3 illustrated in FIG. 1. In any "schematic diagram of visible region" or any diagram titled as a "visible region" and a "schematic diagram" among FIG. 9 and the following diagrams, a region denoted by a number such as "1", "2", or "3" or a symbol such as "+" or "−" corresponds to a sub pixel visually recognizable by a user through the corresponding opening 551.

As illustrated in FIG. 1, a user (for example, the viewpoint U1, U2, or U3) visually recognizes light passing through openings 551 among light entered from the back surface side of the display device 50 and passing through the liquid crystal layer 53 and the color filter layer CF. Thus, each sub pixel visually recognizable by the user is only a sub pixel overlapping an opening 551 on a line of sight.

As illustrated in FIG. 9, sub pixels denoted by "2" in FIG. 7 can be visually recognized at the viewpoint U2. However, sub pixels denoted by a value ("1" or "3") other than "2" in FIG. 7 cannot be visually recognized at the viewpoint U2.

Similarly, sub pixels denoted by "1" in FIG. 7 can be visually recognized at the viewpoint U1. Sub pixels denoted by "3" in FIG. 7 can be visually recognized at the viewpoint U3. Thus, individual images can be displayed and output to the viewpoints U1, U2, and U3 by allocating pixel signals corresponding to an image for the viewpoint U2 to sub pixels denoted by "2", allocating pixel signals corresponding to an image for the viewpoint U1 to sub pixels denoted by "1", and allocating pixel signals corresponding to an image for the viewpoint U3 to sub pixels denoted by "3". Such pixel signal allocation to sub pixels corresponds to the arrangement of the openings 551 described above with reference to FIG. 8. In other words, control of the pixel signal allocation is performed in accordance with the arrangement of the openings 551.

In the example illustrated in FIG. 9, at any user viewpoint, the number of kinds of sub pixels that can be viewed in each row is one. For example, at the viewpoint U2 illustrated in FIG. 9, the second sub pixel Gpix is mainly visually recognizable in the n-th row, the first sub pixel Rpix is mainly visually recognizable in the (n+1)th row, and the third sub pixel Bpix is mainly visually recognizable in the (n+2)th row. In this manner, when the number of kinds of sub pixels that can be viewed in each row is one, the colors are uniform in each row, whereby color separation of each row may be visually recognized by the user. Due to the color separation, unexpected coloring occurs in an image or a stripe pattern in the Y direction is visually recognized by the user in some cases. The stripe pattern is not originally included in the display form of an output image but is generated in accordance with the correspondence relation between the number of kinds of sub pixels described above with reference to FIG. 7, the sub-pixel arrangement in the row direction and pixel signal control, the arrangement of the light-shielding barrier 55 and the openings 551 described above with reference to FIG. 8, and the number of output images (the number of users individually viewing images).

Thus, in the embodiment, the number of kinds of sub pixels and the number of output images do not have an integer-multiple relation. Specifically, the number of kinds of sub pixels and the number of output images are determined in advance so that the greatest common divisor of the number of kinds of sub pixels and the number of output images, in other words, the number of viewpoints provided by one opening is one only. Thus, the number of kinds of sub pixels that can be viewed in each row is not limited to one.

FIG. 10 is a diagram illustrating the correspondence relation between a pixel signal allocation example, a light-shielding pattern, and a visible region at the viewpoint U2. As illustrated in the "allocation example" in FIG. 10, each sub pixel is denoted by any of "1", "2", "3", and "4" in the embodiment. Among the sub pixels, sub pixels denoted by "1", "2", and "3" are the same as those described above with reference to FIG. 7. Each sub pixel denoted by "4" is visually recognizable by a viewpoint different from the viewpoints U1, U2, and U3. The light-shielding pattern schematically illustrates the arrangement of the openings 551 in plan view and includes a light-shielding area provided by the light-shielding barrier 55 and a non-light-shielding area provided by the openings 551.

As illustrated in the "allocation example" in FIG. 10, four sub pixels arranged in the X direction in each row are sub pixels "1", "2", "3", and "4". Such a pattern is formed that the periodical arrangement of sub pixels in the order of "1", "2", "3", and "4" is repeated in each row from the one side in the X direction toward the other side. The difference between a number provided to one of sub pixels adjacent to each other in the Y direction and a number provided to the other sub pixel in each column is two. Specifically, a column in which "1" and "3" are alternately arranged from one side in the Y direction toward the other side and a column in which "2" and "4" are alternately arranged from the one side in the Y direction toward the other side are alternately arranged in the X direction.

As for the light-shielding barrier 55 and the openings 551 according to the embodiment, an opening 551 corresponding to one sub pixel is provided in a region in which four sub pixels are continuously arranged in the X direction in terms of the number of arranged sub pixels, as illustrated in the "light-shielding pattern" in FIG. 10. Specifically, in each pixel row, a region in which about three sub pixels are arranged in the X direction is covered by the light-shielding barrier 55, a region in which one sub pixel is disposed in the X direction is formed as an opening 551, and these regions are alternately arranged in the X direction. The position of each opening 551 in one row (n-th row) of two rows (for example, the n-th row and the (n+1)th row) adjacent to each other in the Y direction is shifted by two sub pixels in the positive X direction from the position of the opening 551 in the other row (the (n+1)th row).

With the combination of the "allocation example" and the "light-shielding pattern" in FIG. 10 described above, an output image in which each row includes the first sub pixel Rpix, the second sub pixel Gpix, and the third sub pixel Bpix is visually recognizable at the viewpoint U2 as illustrated in the "U2-viewpoint visible region". It is also clear from the "allocation example" in FIG. 10 that, in the same manner as in the case of the viewpoint U2, an output image in which each row includes the first sub pixel Rpix, the second sub pixel Gpix, and the third sub pixel Bpix is visually recognizable at each of the viewpoints U1 and U3 through the openings 551.

Figure 11:
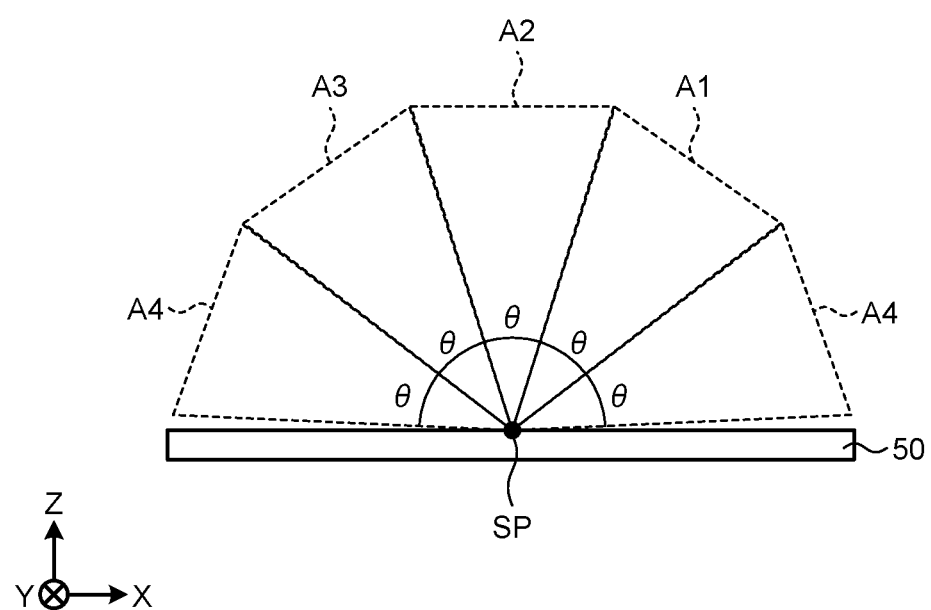
FIG. 11 is a schematic diagram illustrating exemplary angle ranges in which sub pixels "1", "2", "3", and "4" in the "allocation example" are visually recognizable.

FIG. 11 is a schematic diagram illustrating exemplary angle ranges A1, A2, A3, and A4 in which sub pixels "1", "2", "3", and "4" in the "allocation example" are visually recognizable. In FIG. 11, the angle range A1 is a view angle range in which the sub pixel "1" is visually recognizable. The angle range A2 is a view angle range in which the sub pixel "2" is visually recognizable. The angle range A3 is a view angle range in which the sub pixel "3" is visually recognizable. The angle range A4 is a view angle range in which the sub pixel "4" is visually recognizable.

As illustrated in FIG. 11, the angle range A2 expands to both sides in the X direction with the Z direction at a center. The angle range A1 is tilted to one side of the angle range A2 in the X direction. The angle range A3 is tilted to the other side of the angle range A2 in the X direction. The angle ranges A4 are tilted to the outsides of the angle ranges A2 and A3 in the X direction.

The angle θ illustrated in FIG. 11 is the same as the angle θ described above with reference to FIG. 1. Specifically, each of the angle ranges A1, A2, and A3 and the two angle ranges A4 illustrated in FIG. 11 is, for example, the range of 35° with the point SP at a center.

When such a light-shielding pattern is provided that individual images are visually recognizable in the angle ranges A1, A2, A3, and A4 in which the sub pixels "1", "2", "3", and "4" are visually recognizable as described above with reference to FIGS. 10 and 11 to control operation of the sub pixels, it is possible to reduce generation of a stripe pattern in the Y direction as described above with reference to FIG. 9.

In the embodiment, an inversion drive system and the like are determined to reduce deviation of the polarities of the pixels due to inversion drive among viewpoints. Before description of these systems, a typical column inversion drive system is described below with reference to FIG. 12.

FIG. 12 is a diagram illustrating the correspondence relation between the polarity of each sub pixel when the column inversion drive system is employed and a visible region at the viewpoint U2. The column inversion drive system is a system in which the polarities of sub pixels included in each column are made uniform and the polarities of columns adjacent to each other are made different from each other. The polarity of each sub pixel is dependent on the potential difference between the potential of the pixel electrode provided at the sub pixel and the potential of the common electrode shared by the plurality of sub pixels. In FIG. 12 and other drawings, a sub pixel with the pixel electrode provided with a potential higher than the potential of the common electrode is denoted by "+". A sub pixel with the pixel electrode provided with a potential lower than the potential of the common electrode is denoted by "−". The polarity of each pixel periodically alternates.

As illustrated in the "column inversion polarity" in FIG. 12, in the column inversion drive system, the polarities of sub pixels included in one of two columns adjacent to each other are made uniform to be a positive polarity "+" and the polarities of sub pixels included in the other column are made uniform to be a negative polarity "−". When the sub pixels provided with such polarities are viewed at the viewpoint U2 described above with reference to FIG. 10, all visually recognizable sub pixels have the same polarity as illustrated in the "U2-viewpoint visible region" in FIG. 12. The polarities of all sub pixels are "−" in the example illustrated in the "U2-viewpoint visible region" in FIG. 12 but periodically alternate between "+" and "−". When the column inversion drive system is employed in the combination of the sub pixel control and the light-shielding pattern described above with reference to FIG. 10, the polarities of sub pixels simultaneously visually recognizable at one viewpoint are made uniform to be a single polarity even when viewed at any other viewpoint. Thus, when the polarities of sub pixels are inverted by the inversion drive, the polarity of the entire image is inverted. As the polarity of the entire image is periodically inverted, display output appears to be flickering in some cases.

Thus, in the embodiment, an inversion drive system other than the column inversion drive system is employed when the combination of the sub pixel control and the light-shielding pattern described above with reference to FIG. 10 is employed.

Figure 13:
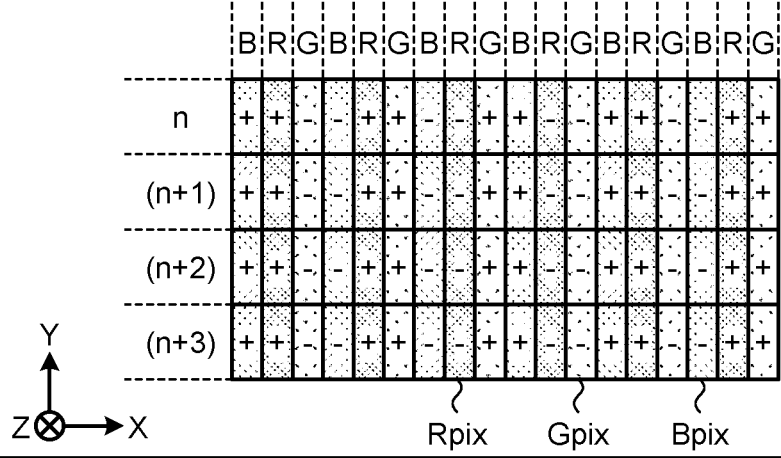
FIG. 13 is a diagram illustrating the correspondence relation between the polarity of each sub pixel and a visible region at the viewpoint U2 when a two-column inversion drive system is employed.

FIG. 13 is a diagram illustrating the correspondence relation between the polarity of each sub pixel and a visible region at the viewpoint U2 when a two-column inversion drive system is employed. The two-column inversion drive system is a system in which the polarities of sub pixels included in each column are made uniform and the polarities of columns are changed in two-column cycles. As illustrated in the "two-column inversion polarity" in FIG. 13, in the two-column inversion drive system, the polarities of sub pixels included in two columns among four columns continuous in the X direction are made uniform to be "+" and the polarities of sub pixels included in the other two columns are made uniform to be "−". The polarities of sub pixels included in one of two columns adjacent to a certain column are the same as the polarities of sub pixels included in the certain column. The polarities of sub pixels included in the other column of the two columns adjacent to the certain column are different from the polarities of sub pixels included in the certain column. When the sub pixels provided with such polarities are viewed at the viewpoint U2 described above with reference to FIG. 10, the visually recognizable sub pixels include sub pixels each having the polarity of "+" and sub pixels each having the polarity of "−" in a mixed manner as illustrated in the "U2-viewpoint visible region" in FIG. 13.

FIG. 14 is a diagram illustrating the correspondence relation between the polarity of each sub pixel and a visible region at the viewpoint U2 when a dot inversion drive system is employed. The dot inversion drive system is a system in which the polarities of sub pixels adjacent to each other in the X and Y directions are made different from each other. As illustrated in the "dot inversion polarity" in FIG. 13, in the dot inversion drive system, the polarities of two sub pixels adjacent to each other in the Y direction in each column are made different from each other. Also in the dot inversion drive system, the polarities of two sub pixels adjacent to each other in the X direction in each row are made different from each other. When the sub pixels provided with such polarities are viewed at the viewpoint U2 described above with reference to FIG. 10, the visually recognizable sub pixels include sub pixels each having the polarity of "+" and sub pixels each having the polarity of "−" in a mixed manner as illustrated in the "U2-viewpoint visible region" in FIG. 13.

As described above with reference to FIGS. 13 and 14, even when the polarities of sub pixels that are simultaneously visually recognized at one viewpoint are made uniform by employing an inversion drive system (for example, the column inversion drive system), the sub pixels that are simultaneously visually recognized at one viewpoint can include sub pixels each having the polarity of "+" and sub pixels each having the polarity of "−" in a mixed manner by employing another inversion drive system (for example, the two-column inversion drive system or the dot inversion drive system).

Modifications

Although the embodiment is described above based on the configuration described with reference to FIG. 10, the embodiment of the present disclosure are not limited thereto. The following describes modifications of the embodiment.

First Modification

FIG. 15 is a diagram illustrating the correspondence relation between a pixel signal allocation example, a light-shielding pattern, and a visible region at the viewpoint U2 in a first modification. The "allocation example" in FIG. 15 is the same as the "allocation example" in FIG. 10 in that four sub pixels arranged in the X direction in each row are sub pixels "1", "2", "3", and "4", and such a pattern is formed that the periodical arrangement of sub pixels in the order of "1", "2", "3", and "4" is repeated from the one side in the X direction toward the other side.

However, an allocation pattern of "1", "2", "3", and "4" to the sub pixels arranged in the Y direction in each column is different between the "allocation example" in FIG. 15 and the "allocation example" in FIG. 10.

Specifically, in the "allocation example" in FIG. 15, sub pixels "1", "2", "3", and "4" are periodically arranged in the Y direction in this order from one end side toward the other end side in a column in which a sub pixel "1" is positioned at one end (for example, the upper end in FIG. 15) of the column. When a sub pixel "2" is positioned at the one end of a column, sub pixels "2", "3", "4", and "1" are periodically arranged in the Y direction in this order from the one end side toward the other end side. When a sub pixel "3" is positioned at the one end of a column, sub pixels "3", "4", "1", and "2" are periodically arranged in the Y direction in this order from the one end side toward the other end side. When a sub pixel "4" is positioned at the one end of a column, sub pixels "4", "1", "2", and "3" are periodically arranged in the Y direction in this order from the one end side toward the other end side.

As illustrated in the "light-shielding pattern" in FIG. 15, the light-shielding barrier 55 and the openings 551 according to the first modification are the same as in the "light-shielding pattern" in FIG. 10 in that an opening 551 corresponding to one sub pixel is provided in a region in which four sub pixels are continuously arranged in the X direction in terms of the number of arranged sub pixels. Specifically, in each pixel row, a region in which about three sub pixels are arranged in the X direction is covered by the light-shielding barrier 55, a region in which one sub pixel is disposed in the X direction is formed as an opening 551, and these regions are alternately arranged in the X direction.

However, as illustrated in the "light-shielding pattern" in FIG. 15, the light-shielding barrier 55 and the openings 551 according to the first modification are different from those in the "light-shielding pattern" in FIG. 10. Specifically, the position of each opening 551 in a middle row (the (n+1)th row) among three rows (for example, the n-th to (n+2)th rows) adjacent to each other in the Y direction is shifted by two sub pixels in the positive X direction from the position of the corresponding opening 551 in one row (n-th row) of two rows facing each other in the Y direction with the middle row interposed therebetween. The position of each opening 551 in the middle row (the (n+1)th row) is shifted by one sub pixel in the negative X direction from the position of the corresponding opening 551 in the other row (the (n+2)th row) of the two rows facing each other in the Y direction with the middle row interposed therebetween. The negative direction is opposite to the positive direction.

The following describes, as a more specific example, the arrangement of openings 551 in a region that corresponds to 16 sub pixels disposed in a matrix of four rows and four columns and in which one opening 551 is positioned on the one side in the Y direction and the one side in the X direction. The other openings 551 in the region are positioned in the second row from the one side in the Y direction and the third column from the one side in the X direction, in the third row from the one side in the Y direction and the fourth column from the one side in the X direction, and in the fourth row from the one side in the Y direction and the second column from the one side in the X direction. In FIG. 15, the region of four rows×four columns is denoted by a reference sign FA1.

With the combination of the "allocation example" and the "light-shielding pattern" in FIG. 15 described above, an output image in which each row includes the first sub pixel Rpix, the second sub pixel Gpix, and the third sub pixel Bpix is visually recognizable at the viewpoint U2 as illustrated in the "U2-viewpoint visible region". It is also clear from the "allocation example" in FIG. 15 that, in the same manner as in the case of the viewpoint U2, an output image in which each row includes the first sub pixel Rpix, the second sub pixel Gpix, and the third sub pixel Bpix is visually recognizable at each of the viewpoints U1 and U3.

With the combination of the "allocation example" and the "light-shielding pattern" in the first modification described above with reference to FIG. 15, the polarities of sub pixels simultaneously visually recognizable at one viewpoint are not made uniform to be a single polarity even in the column inversion drive system.

Figure 16:
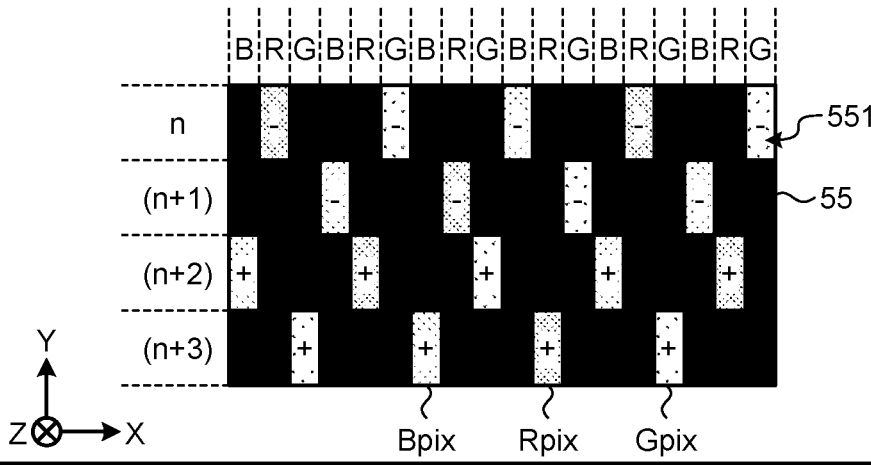
FIG. 16 is a diagram illustrating the polarity of each sub pixel in a visible region at the viewpoint U2 in the case of the column inversion drive system, in the case of the two-column inversion drive system and in the case of the dot inversion drive system.

FIG. 16 is a diagram illustrating the polarity of each sub pixel in a visible region at the viewpoint U2 in the case of the column inversion drive system, in the case of the two-column inversion drive system and in the case of the dot inversion drive system. The polarities of sub pixels when the column inversion drive system is employed are as described above with reference to the "column inversion polarity" in FIG. 12. The polarities of sub pixels when the two-column inversion drive system is employed are as described above with reference to the "two-column inversion polarity" in FIG. 13. The polarities of sub pixels when the dot inversion drive system is employed are as described above with reference to the "dot inversion polarity" in FIG. 14.

As illustrated in FIG. 16, with the combination of the "allocation example" and the "light-shielding pattern" in the first modification, the sub pixels simultaneously visually recognized at one viewpoint can be caused to include sub pixels each having the polarity of "+" and sub pixels each having the polarity of "−" in a mixed manner even in any of the column inversion drive system, the two columns drive inversion drive system, and the dot inversion drive system.

Second Modification

FIG. 17 is a diagram illustrating a pixel signal allocation example in a second modification. As in the second modification, the state of each sub pixel at a position denoted by "4" in the first modification may be different from that in the first modification.

Specifically, as illustrated in, for example, FIG. 17, each sub pixel denoted by "4" in the "allocation example" in FIG. 15 may be allocated to outputting of white or black. In the "white output allocation example" in FIG. 17, each sub pixel allocated to outputting of white is denoted by "W". In the "black-outputting allocation example" in FIG. 17, each sub pixel allocated to outputting of black is denoted by "b". The outputting of white may be achieved by color generation through subtractive color mixing of light in red (R), green (G), and blue (B) or may be achieved by providing a colorless color filter or no color filter to each sub pixel denoted by "W". The outputting of black may be achieved by minimizing the degree of light transmitted through sub pixels, in other words, providing the lowest gradation value to the sub pixels or may be achieved by preventing light from passing through the position of each sub pixel denoted by "B" by, for example, shielding the position of the sub pixel with the black matrix BM.

Third Modification

Figure 18:
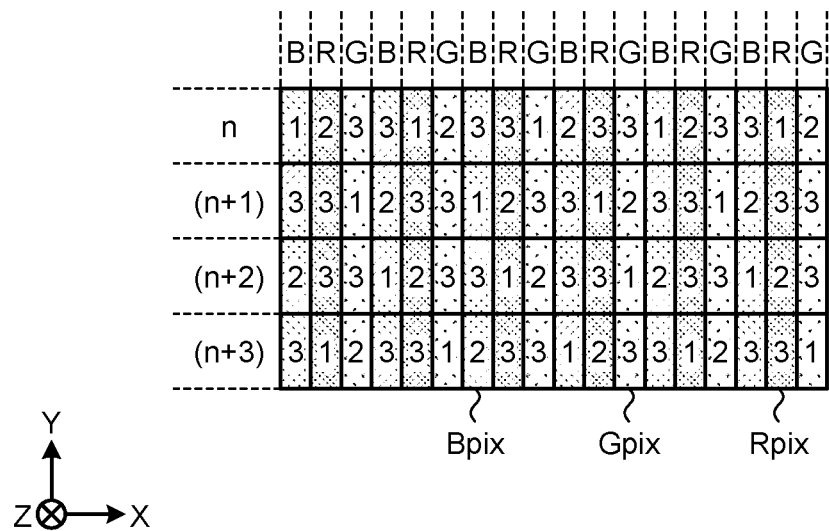
FIG. 18 is a diagram illustrating a pixel signal allocation example in a third modification.

FIG. 18 is a diagram illustrating a pixel signal allocation example in a third modification. As in the third modification, each sub pixel at a position denoted by "4" in the embodiment may be allocated to image outputting to the viewpoint U3 (or the viewpoint U1). In the example illustrated in FIG. 18, each sub pixel at a position denoted by "4" in the embodiment is allocated to image outputting to the viewpoint U3. Specifically, each sub pixel at a position denoted by "4" in the "allocation example" in FIG. 10 is denoted by "3" in FIG. 18.

Figure 19:
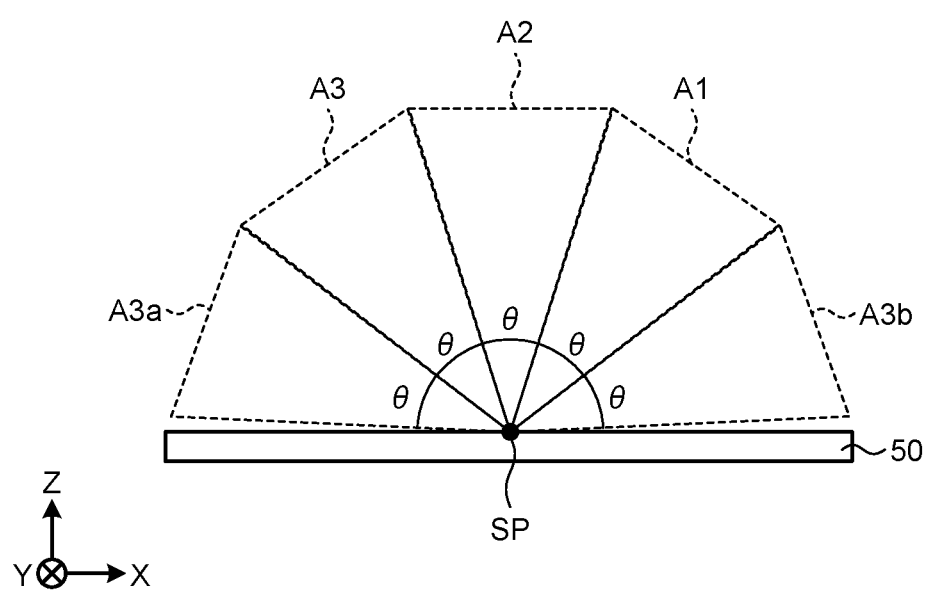
FIG. 19 is a schematic diagram illustrating exemplary angle ranges in which sub pixels "1", "2", and "3" are visually recognizable in the "allocation example" described with reference to FIG. 18.

FIG. 19 is a schematic diagram illustrating exemplary angle ranges A1, A2, A3, A3a, and A3b in which sub pixels "1", "2", and "3" are visually recognizable in the "allocation example" described above with reference to FIG. 18. In the example illustrated in FIG. 19, the angle ranges A4 in FIG. 11 are replaced with the angle ranges A3a and A3b. In the angle ranges A3a and A3b, in a similar manner to the case of the angle range A3, each sub pixel "3" is visually recognizable. According to the third modification, it is possible to increase the range in which an image is visually recognizable by a particular user (for example, the viewpoint U3).

Each sub pixel at a position denoted by "4" in the embodiment is allocated to image outputting to the viewpoint U3 in the example described above with reference to FIGS. 18 and 19 but may be allocated to image outputting to the viewpoint U1. In this case, in the angle ranges A3a and A3b in FIG. 19, in a similar manner to the case of the angle range A1, each sub pixel "1" is visually recognizable.

Fourth Modification

FIG. 20 is a diagram illustrating a pixel signal allocation example in a fourth modification. In the fourth modification, each sub pixel is denoted by any of "1", "2", "3", "4", and "5". Among the sub pixels, sub pixels denoted by "1", "2", "3", and "4" are the same as those described above with reference to FIGS. 7 and 10. Each sub pixel denoted by "5" is visually recognizable at a viewpoint different from the viewpoints U1, U2, and U3 and from a viewpoint at which each sub pixel denoted by "4" is visually recognizable. Specifically, in FIG. 20, individual images are output to the five viewpoints.

In the "five-viewpoint image allocation example 1" and the "five-viewpoint image allocation example 2" in FIG. 20, five sub pixels arranged in the X direction in each row are sub pixels "1", "2", "3", "4", and "5". Such a pattern is formed that the periodical arrangement of sub pixels in the order of "1", "2", "3", "4", and "5" is repeated from the one side in the X direction toward the other side.

In the "five-viewpoint image allocation example 1" in FIG. 20, sub pixels "5", "2", "3", "5", and "1" are periodically arranged in the Y direction in this order from the one end side toward the other end side in a column in which a sub pixel "5" is positioned at the one end of the column. Sub pixels "1", "3", "4", "1", and "2" are periodically arranged in the Y direction in this order from the one end side toward the other end side in a column in which a sub pixel "1" is positioned at the one end of the column. Sub pixels "2", "4", "5", "2", and "3" are periodically arranged in the Y direction in this order from the one end side toward the other end side in a column in which a sub pixel "2" is positioned at the one end of the column. Sub pixels "3", "5", "1", "3", and "4" are periodically arranged in the Y direction in this order from the one end side toward the other end side in a column in which a sub pixel "3" is positioned at the one end of the column. Sub pixels "4", "1", "2", "4", and "5" are periodically arranged in the Y direction in this order from the one end side toward the other end side in a column in which a sub pixel "4" is positioned at the one end of the column.

In the "five-viewpoint image allocation example 2" in FIG. 20, sub pixels "2", "4", "1", "3", and "5" are periodically arranged in the Y direction in this order from the one end side toward the other end side in a column in which a sub pixel "2" is positioned at the one end of the column. Sub pixels "3", "5", "2", "4", and "1" are periodically arranged in the Y direction in this order from the one end side toward the other end side in a column in which a sub pixel "3" is positioned at the one end of the column. Sub pixels "4", "1", "3", "5", and "2" are periodically arranged in the Y direction in this order from the one end side toward the other end side in a column in which a sub pixel "4" is positioned at the one end of the column. Sub pixels "5", "2", "4", "1", and "3" are periodically arranged in the Y direction in this order from the one end side toward the other end side in a column in which a sub pixel "5" is positioned at the one end of the column. Sub pixels "1", "3", "5", "2", and "4" are periodically arranged in the Y direction in this order from the one end side toward the other end side in a column in which a sub pixel "1" is positioned at the one end of the column.

Although not illustrated, in the "light-shielding pattern" in the fourth modification, in other words, in the arrangement of the openings 551 of the light-shielding barrier 55, in each pixel row, a region in which about four sub pixels are arranged in the X direction is covered by the light-shielding barrier 55, a region in which one sub pixel is disposed in the X direction is formed as an opening 551, and these regions are alternately arranged in the X direction. The position of each opening 551 in the middle row (the (n+1)th row) among three rows (for example, the n-th to (n+2)th rows) adjacent to each other in the Y direction is shifted by two sub pixels in the positive X direction from the position of the corresponding opening 551 in one row (n-th row) of two rows facing each other in the Y direction with the middle row interposed therebetween. The position of each opening 551 in the middle row (the (n+1)th row) is shifted by two sub pixels in the negative X direction from the position of the corresponding opening 551 in the other row (the (n+2)th row) of the two rows facing each other in the Y direction with the middle row interposed therebetween.

The following describes, as the "light-shielding pattern" employed in the "five-viewpoint image allocation example 1" in FIG. 20, the arrangement of openings 551 in a region that corresponds to 25 sub pixels disposed in a matrix of five rows and five columns and in which one opening 551 is positioned on the one side in the Y direction and the one side in the X direction. The other openings 551 in the region are positioned in the second row from the one side in the Y direction and the fourth column from the one side in the X direction, in the third row from the one side in the Y direction and the third column from the one side in the X direction, in the fourth row from the one side in the Y direction and the first column from the one side in the X direction, and in the fifth row from the one side in the Y direction and the fifth column from the one side in the X direction.

The following describes, as the "light-shielding pattern" employed in the "five-viewpoint image allocation example 2" in FIG. 20, the arrangement of openings 551 in a region that corresponds to 25 sub pixels disposed in a matrix of five rows and five columns and in which one opening 551 is positioned on the one side in the Y direction and the one side in the X direction. The other openings 551 in the region are positioned in the second row from the one side in the Y direction and the fourth column from the one side in the X direction, in the third row from the one side in the Y direction and the second column from the one side in the X direction, in the fourth row from the one side in the Y direction and the fifth column from the one side in the X direction, and in the fifth row from the one side in the Y direction and the third column from the one side in the X direction.

Figure 21:
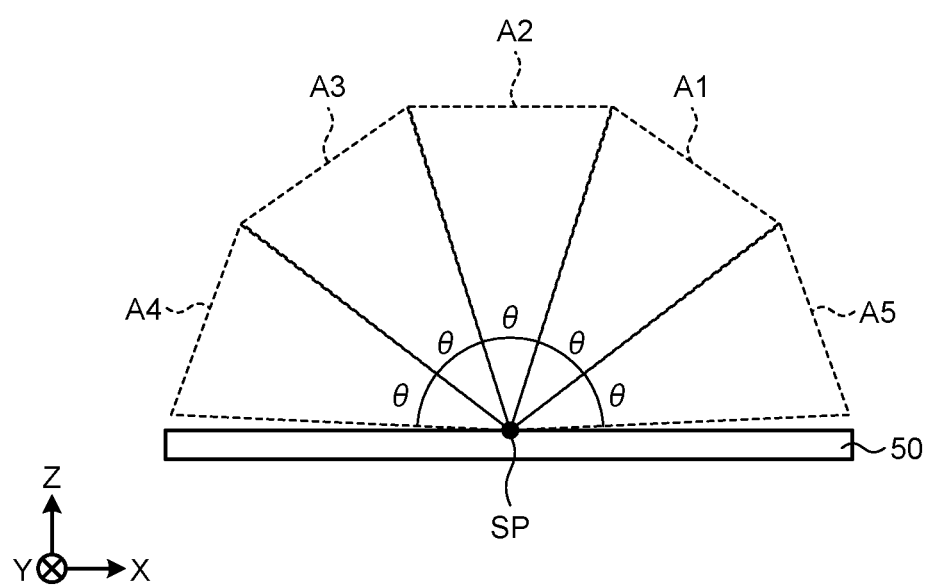
FIG. 21 is a schematic diagram illustrating exemplary angle ranges in which sub pixels "1", "2", "3", "4", and "5" are visually recognizable in a "five-viewpoint image allocation example 1" and a "five-viewpoint image allocation example 2" described with reference to FIG. 20.

FIG. 21 is a schematic diagram illustrating exemplary angle ranges A1, A2, A3, A4, and A5 in which sub pixels "1", "2", "3", and "4", and "5" in the "five-viewpoint image allocation example 1" and the "five-viewpoint image allocation example 2" described above with reference to FIG. 20 are visually recognizable. In the example illustrated in FIG. 21, one of the angle ranges A4 in FIG. 11 is replaced with the angle range A5. In the angle range A5, a sub pixel "5" is visually recognizable. According to the third modification, it is possible to increase the range in which an image is visually recognizable by a particular user (for example, the viewpoint U3).

In the fourth modification, a sub pixel "4" may be changed to a sub pixel "1" or a sub pixel "5" may be changed to a sub pixel "3", or both changes may be performed.

Fifth Modification

The following describes a fifth modification with reference to FIG. 23, but before the description, a case in which the number of kinds of sub pixels is assumed to be four and the number of viewpoints at which image are visually recognized is assumed to be two will be described below with reference to FIG. 22. In the following description, the expression of j-sub-pixel/k-viewpoint means a case in which the number of kinds of sub pixels is j and the number of viewpoints for visual recognition of images is k. The number j is a natural number equal to two or larger.

FIG. 22 is a diagram illustrating a pixel signal allocation example in a four-sub-pixel/two-viewpoint case and a visible region made up of sub pixels visually recognizable at a second viewpoint as one of the two viewpoints. As illustrated in the "four-sub-pixel/two-viewpoint allocation example" in FIG. 22, for example, the first sub pixel Rpix, the second sub pixel Gpix, and the third sub pixel Bpix as well as the fourth sub pixel Wpix are provided as the four kinds of sub pixels. The fourth sub pixel Wpix is provided with a colorless color filter or no color filter. In FIG. 22 and other drawings, each column in which the fourth sub pixel Wpix is arranged is denoted by "W" illustrated on the one side in the Y direction. In the example illustrated in FIG. 22 and other drawings, columns are periodically arranged from the one side in the X direction toward the other side in the order of a column in which the third sub pixels Bpix are arranged in the Y direction, a column in which the fourth sub pixels Wpix are arranged in the Y direction, a column in which the first sub pixels Rpix are arranged in the Y direction, and a column in which the second sub pixels Gpix are arranged in the Y direction.

In the "four-sub-pixel/two-viewpoint allocation example" in FIG. 22, two sub pixels arranged in the X direction in each row are sub pixels "1" and "2". Such a pattern is formed that the periodical alternate arrangement of sub pixels "1" and "2" is repeated from the one side in the X direction toward the other side. Two sub pixels arranged in the Y direction in each column are sub pixels "1" and "2". Such a pattern is formed that the periodical alternate arrangement of sub pixels "1" and "2" is repeated from the one side in the Y direction toward the other side. Specifically, sub pixels "1" are disposed in a staggered pattern. Sub pixels "2" are disposed in a staggered pattern.

In the arrangement of the openings 551 of the light-shielding barrier 55 provided with an assumption of the "four-sub-pixel/two-viewpoint allocation example" in FIG. 22, in each pixel row, a region in which about one sub pixel is arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 22. The position of each opening 551 in one row (n-th row) of two rows (for example, the n-th row and the (n+1)th row) adjacent to each other in the Y direction is shifted by one sub pixel in the positive X direction from the position of the corresponding opening 551 in the other row (the (n+1)th row). Specifically, the light-shielding regions of the light-shielding barrier 55 are disposed in a staggered pattern. The openings 551 are disposed in a staggered pattern.

With such combination of the allocation of pixel signals to sub pixels and the arrangement of the openings 551 of the light-shielding barrier 55, a row in which the fourth sub pixels Wpix and the second sub pixels Gpix are visually recognizable and a row in which the third sub pixels Bpix and the first sub pixels Rpix are visually recognizable are alternately arranged in the Y direction as illustrated in the "second-viewpoint visible region" in FIG. 22. The fourth sub pixels Wpix and the second sub pixels Gpix appear brighter than the third sub pixels Bpix and the first sub pixels Rpix. Thus, in the four-sub-pixel/two-viewpoint case described above with reference to FIG. 22, light and dark stripes in the Y direction are generated in an image. Although not illustrated, light and dark stripes are generated in the same manner in a visible region at a first viewpoint as the other of the two viewpoints.

Thus, when the four-sub-pixel/two-viewpoint case is assumed, it is possible to reduce the above-described generation of light and dark stripes in the Y direction by assuming a virtual third person and allocating pixel signals to sub pixels so that individual images are output to three viewpoints. In other words, a virtual viewpoint is set in advance so that the greatest common divisor of the number of kinds of sub pixels and the number of images simultaneously output in accordance with the number (total viewpoint number) of viewpoints including the virtual viewpoint is one only.

Figure 23:
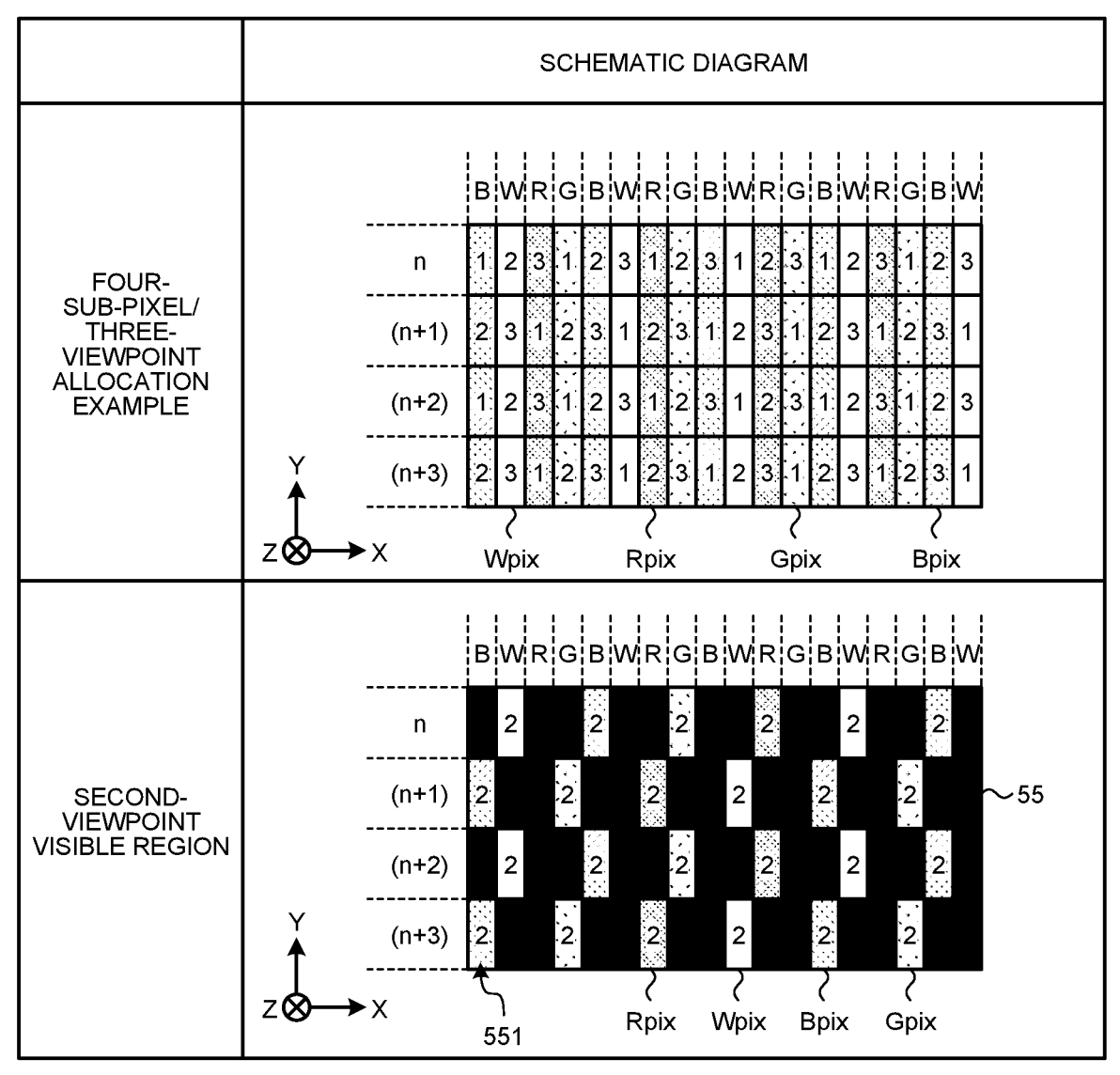

FIG. 23 is a diagram illustrating a pixel signal allocation example in a four-sub-pixel/three-viewpoint case and a visible region made up of sub pixels visually recognizable at a second viewpoint as one of the three viewpoints. In the "four-sub-pixel/three-viewpoint allocation example" in FIG. 23, three sub pixels arranged in the X direction in each row are sub pixels "1", "2", and "3". Such a pattern is formed that the periodical arrangement of sub pixels in the order of "1", "2", and "3" is repeated from the one side in the X direction toward the other side.

In the "four-sub-pixel/three-viewpoint allocation example" in FIG. 23, sub pixels "1" and "2" are alternately arranged in the Y direction in a column in which a sub pixel "1" is positioned at the one end of the column. Sub pixels "2" and "3" are alternately arranged in the Y direction in a column in which a sub pixel "2" is positioned at the one end of the column. Sub pixels "3" and "1" are alternately arranged in the Y direction in a column in which a sub pixel "3" is positioned at the one end of the column.

In the arrangement of the openings 551 of the light-shielding barrier 55 provided with an assumption of the "four-sub-pixel/three-viewpoint allocation example" in FIG. 23, in each pixel row, a region in which about two sub pixels are arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 23. The position of each opening 551 in the middle row (the (n+1)th row) among three rows (for example, the n-th to (n+2)th rows) adjacent to each other in the Y direction is shifted by one sub pixel in the positive X direction from the position of the corresponding opening 551 in one row (n-th row) of two rows facing each other in the Y direction with the middle row interposed therebetween. The position of each opening 551 in the middle row (the (n+1)th row) is shifted by one sub pixel in the positive X direction from the position of the corresponding opening 551 in the other row (the (n+2)th row) of the two row facing each other in the Y direction with the middle row interposed therebetween. In other words, the arrangement of openings 551 in the X direction in one of two rows facing each other in the Y direction with one row interposed therebetween is the same as the arrangement of openings 551 in the X direction in the other of the two rows.

With such combination of the allocation of pixel signals to sub pixels and the arrangement of the openings 551 of the light-shielding barrier 55, each row includes the fourth sub pixel Wpix, the second sub pixel Gpix, the third sub pixel Bpix, and the first sub pixel Rpix as illustrated in the "second-viewpoint visible region" in FIG. 23. In this manner, even when two persons are assumed to be users who visually recognize individual images, it is possible to reduce light and dark stripes in the Y direction in an image by allocating pixel signals with an assumption of a third viewpoint.

Sixth Modification

The following describes a sixth modification with reference to FIG. 25, but before the description, a four-sub-pixel/four-viewpoint case will be described below with reference to FIG. 24.

FIG. 24 is a diagram illustrating a pixel signal allocation example in a four-sub-pixel/four-viewpoint case and a visible region made up of sub pixels visually recognizable at a second viewpoint as one of the four viewpoints. In the "four-sub-pixel/two-viewpoint allocation example" in FIG. 24, as in the sub-pixel arrangement described above with reference to FIG. 22, columns are periodically arranged from the one side in the X direction toward the other side in the order of a column in which the third sub pixels Bpix are arranged in the Y direction, a column in which the fourth sub pixels Wpix are arranged in the Y direction, a column in which the first sub pixels Rpix are arranged in the Y direction, and a column in which the second sub pixels Gpix are arranged in the Y direction.

In the "four-sub-pixel/four-viewpoint allocation example" in FIG. 24, four sub pixels arranged in the X direction in each row are sub pixels "1", "2", "3", and "4". Such a pattern is formed that the periodical arrangement of sub pixels in the order of "1", "2", "3", and "4" is repeated from the one side in the X direction toward the other side.

In the "four-sub-pixel/four-viewpoint allocation example" in FIG. 24, sub pixels "1" and "3" are alternately arranged in the Y direction in a column in which a sub pixel "1" or a sub pixel "3" is positioned at the one end of the column. Sub pixels "2" and "4" are alternately arranged in the Y direction in a column in which a sub pixel "2" or a sub pixel "4" is positioned at the one end of the column.

In the arrangement of the openings 551 of the light-shielding barrier 55 provided with an assumption of the "four-sub-pixel/four-viewpoint allocation example" in FIG. 24, in each pixel row, a region in which about three sub pixels are arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 24. The position of each opening 551 in one row (n-th row) of two rows (for example, the n-th row and the (n+1)th row) adjacent to each other in the Y direction is shifted by two sub pixels in the positive X direction from the position of the corresponding opening 551 in the other row (the (n+1)th row).

With such combination of the allocation of pixel signals to sub pixels and the arrangement of the openings 551 of the light-shielding barrier 55, a row in which the fourth sub pixels Wpix are visually recognizable and a row in which the second sub pixels Gpix are visually recognizable are alternately arranged in the Y direction as illustrated in the "second-viewpoint visible region" in FIG. 24. Although not illustrated, a visible region made up of sub pixels visually recognizable at a fourth viewpoint as another one of the four viewpoints has the same configuration as that in the case of the second viewpoint. At first and third viewpoints as the remaining two of the four viewpoints, a row in which the first sub pixels Rpix are visually recognizable and a row in which the third sub pixels Bpix are visually recognizable are alternately arranged in the Y direction. Thus, in the four-sub-pixel/four-viewpoint case described above with reference to FIG. 24, only two kinds of sub pixels among the four kinds of sub pixels in colors are visually recognizable at any viewpoint.

Thus, when the four-sub-pixel/four-viewpoint case is assumed, it is possible to allow all sub pixels to be visually recognizable at each viewpoint by assuming a virtual fifth person and allocating pixel signals to sub pixels so that individual images are output to five viewpoints.

Figure 25:
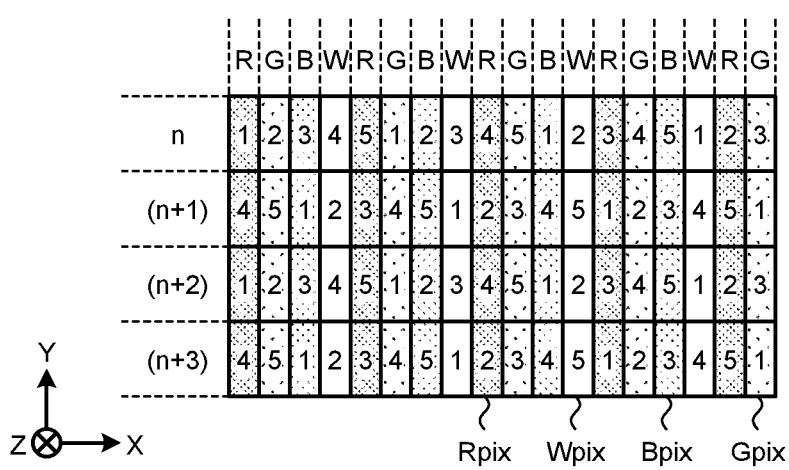
FIG. 25 is a diagram illustrating a pixel signal allocation example in a four-sub-pixel/five-viewpoint case and a visible region made up of sub pixels visually recognizable at a second viewpoint as one of the five viewpoints.

FIG. 25 is a diagram illustrating a pixel signal allocation example in a four-sub-pixel/five-viewpoint case and a visible region made up of sub pixels visually recognizable at a second viewpoint as one of the five viewpoints. In the "four-sub-pixel/five-viewpoint allocation example" in FIG. 25, five sub pixels arranged in the X direction in each row are sub pixels "1", "2", "3", "4", and "5". Such a pattern is formed that the periodical arrangement of sub pixels in the order of "1", "2", "3", "4", and "5" is repeated from the one side in the X direction toward the other side.

In the "four-sub-pixel/five-viewpoint allocation example 1" in FIG. 25, sub pixels "1" and "4" are alternately arranged in the Y direction in a column in which a sub pixel "1" is positioned at the one end of the column. Sub pixels "2" and "5" are alternately arranged in the Y direction in a column in which a sub pixel "2" is positioned at the one end of the column. Sub pixels "3" and "1" are alternately arranged in the Y direction in a column in which a sub pixel "3" is positioned at the one end of the column. Sub pixels "4" and "2" are alternately arranged in the Y direction in a column in which a sub pixel "4" is positioned at the one end of the column. Sub pixels "5" and "3" are alternately arranged in the Y direction in a column in which a sub pixel "5" is positioned at the one end of the column.

In the arrangement of the openings 551 of the light-shielding barrier 55 provided with an assumption of the "four-sub-pixel/five-viewpoint allocation example" in FIG. 25, in each pixel row, a region in which about four sub pixels are arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 25. The position of each opening 551 in the middle row (the (n+1)th row) among three rows (for example, the n-th to (n+2)th rows) adjacent to each other in the Y direction is shifted by two sub pixels in the positive X direction from the position of the corresponding opening 551 in one row (n-th row) of two rows facing each other in the Y direction with the middle row interposed therebetween. The position of each opening 551 in the middle row (the (n+1)th row) is shifted by two sub pixels in the positive X direction from the position of the corresponding opening 551 in the other row (the (n+2)th row) of the two row facing each other in the Y direction with the middle row interposed therebetween. In other words, the arrangement of openings 551 in the X direction in one of two rows facing each other in the Y direction with one row interposed therebetween is the same as the arrangement of openings 551 in the X direction in the other of the two rows.

With such combination of the allocation of pixel signals to sub pixels and the arrangement of the openings 551 of the light-shielding barrier 55, each row includes the fourth sub pixel Wpix, the second sub pixel Gpix, the third sub pixel Bpix, and the first sub pixel Rpix as illustrated in the "second-viewpoint visible region" in FIG. 25. In this manner, even when four persons are assumed to be users who visually recognize individual images, it is possible to allow all sub pixels to be visually recognizable at each viewpoint by allocating pixel signals with an assumption of a fifth viewpoint.

The combination of the pixel signal allocation in the four-sub-pixel/five-viewpoint case and the arrangement of the openings 551 is not limited to that described above with reference to FIG. 25.

FIG. 26 is a diagram illustrating a pixel signal allocation example in a four-sub-pixel/five-viewpoint case and a visible region made up of sub pixels visually recognizable at a second viewpoint as one of the five viewpoints. In the "four-sub-pixel/five-viewpoint allocation example" in FIG. 26, five sub pixels arranged in the X direction in each row are sub pixels "1", "2", "3", "4", and "5".

In the "four-sub-pixel/five-viewpoint allocation example 2" in FIG. 26, such a pattern is formed that the periodical arrangement of sub pixels in the order of "1", "2", "3", "4", and "5" is repeated from the one side in the X direction toward the other side. In addition, such a pattern is formed that the periodical arrangement of sub pixels in the order of "1", "3", "5", "2", and "4" is repeated from the one side in the Y direction toward the other side.

In the arrangement of the openings 551 of the light-shielding barrier 55 provided with an assumption of the "four-sub-pixel/five-viewpoint allocation example 2" in FIG. 26, in each pixel row, a region in which about four sub pixels are arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 26. The position of each opening 551 in the middle row (the (n+1)th row) among three rows (for example, the n-th to (n+2)th rows) adjacent to each other in the Y direction is shifted by two sub pixels in the positive X direction from the position of the corresponding opening 551 in one row (n-th row) of two rows facing each other in the Y direction with the middle row interposed therebetween. The position of each opening 551 in the middle row (the (n+1)th row) is shifted by two sub pixels in the negative X direction from the position of the corresponding opening 551 in the other row (the (n+2)th row) of the one row facing each other in the Y direction with the middle row interposed therebetween. With the combination of the pixel signal allocation and the arrangement of the openings 551 of the light-shielding barrier 55 described above with reference to FIG. 26, each row includes the fourth sub pixel Wpix, the second sub pixel Gpix, the third sub pixel Bpix, and the first sub pixel Rpix.

Seventh Modification

Figure 27:
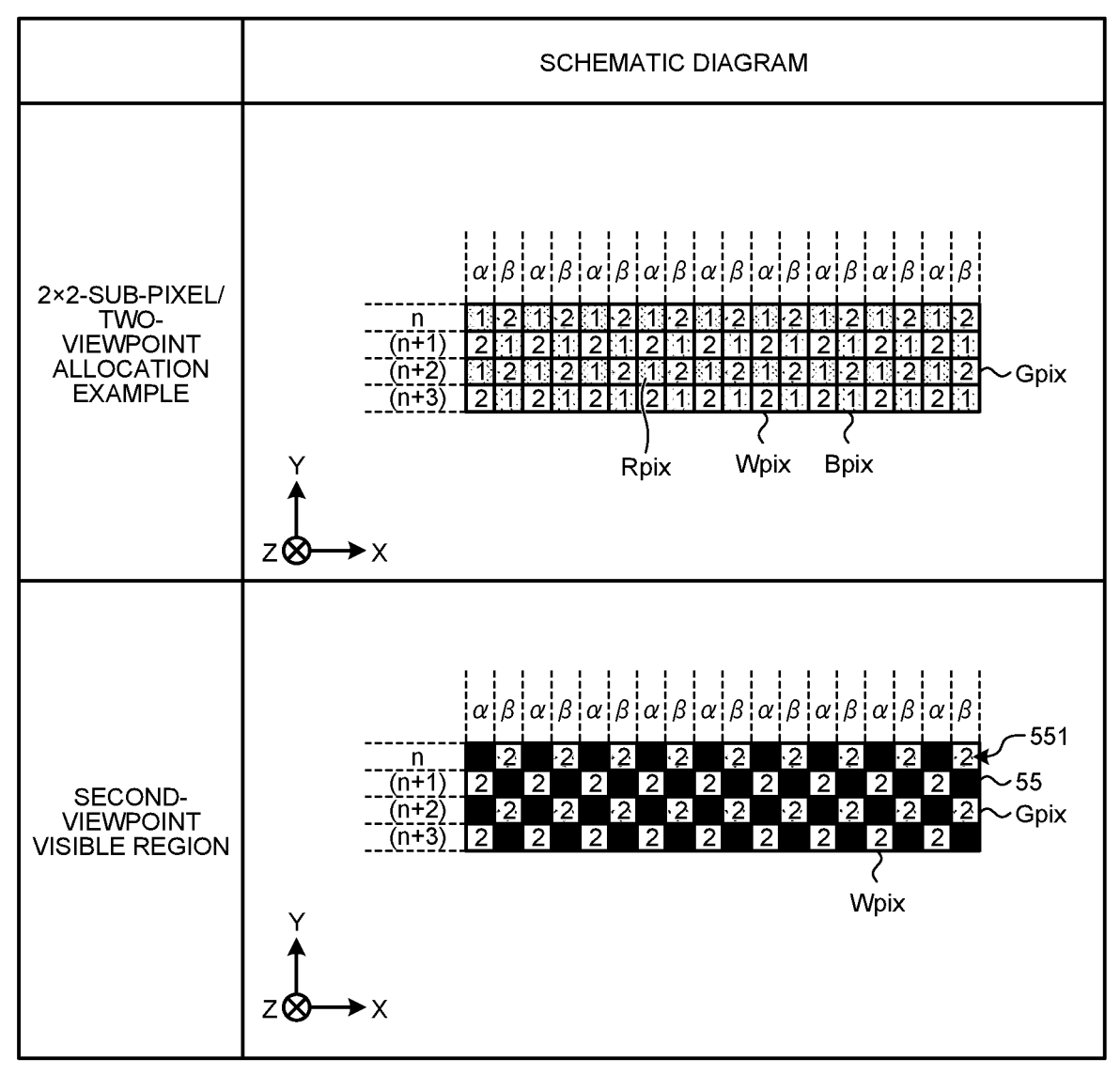
Figure 28:
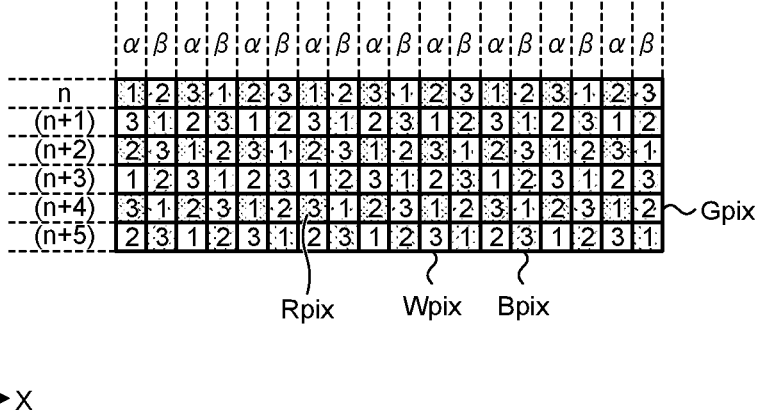
FIG. 28 is a diagram illustrating a pixel signal allocation example in a 2×2-sub-pixel/three-viewpoint case and a visible region made up of sub pixels visually recognizable at a second viewpoint as one of the three viewpoints.

The following describes a seventh modification with reference to FIG. 28, but before the description, a case (2×2-sub-pixel/two-viewpoint) in which two viewpoints are assumed to be viewpoints for visual recognition of images in the arrangement of 2×2 sub pixels including four kinds of sub pixels made up of two kinds of the sub pixels included in one of two columns adjacent to each other in the X direction and the other two kinds of the sub pixels included in the other column will be described below with reference to FIG. 27.

FIG. 27 is a diagram illustrating a pixel signal allocation example in a 2×2-sub-pixel/two-viewpoint case and a visible region made up of sub pixels visually recognizable at a second viewpoint as one of the two viewpoints. As illustrated in the "2×2-sub-pixel/two-viewpoint allocation example" in FIG. 27, for example, the first sub pixel Rpix, the second sub pixel Gpix, and the third sub pixel Bpix as well as the fourth sub pixel Wpix are provided as the four kinds of sub pixels. The first sub pixel Rpix and the second sub pixel Gpix are alternately arranged in the X direction in one of two rows adjacent to each other in the Y direction. The fourth sub pixel Wpix and the third sub pixel Bpix are alternately arranged in the X direction in the other of the two rows adjacent to each other in the Y direction. The first sub pixel Rpix and the fourth sub pixel Wpix are alternately arranged in the Y direction in one of two columns adjacent to each other in the X direction. The second sub pixel Gpix and the third sub pixel Bpix are alternately arranged in the Y direction in the other of the two columns adjacent to each other in the X direction. In FIG. 27 and other drawings, a column in which the first sub pixel Rpix and the fourth sub pixel Wpix are alternately arranged in the Y direction is denoted by "a" illustrated on the one side in the Y direction. A column in which the second sub pixel Gpix and the third sub pixel Bpix are alternately arranged in the Y direction is denoted by "S" illustrated on the one side in the Y direction.

In the "2×2-sub-pixel/two-viewpoint allocation example" in FIG. 27, two sub pixels arranged in the X direction in each row are sub pixels "1" and "2". Such a pattern is formed that the periodical alternate arrangement of sub pixels "1" and "2" is repeated from the one side in the X direction toward the other side. Two sub pixels arranged in the Y direction in each column are sub pixels "1" and "2". Such a pattern is formed that the periodical alternate arrangement of sub pixels "1" and "2" is repeated from the one side in the Y direction toward the other side. Specifically, sub pixels "1" are disposed in a staggered pattern. Sub pixels "2" are disposed in a staggered pattern.

In the arrangement of the openings 551 of the light-shielding barrier 55 provided with an assumption of the "2×2-sub-pixel/two-viewpoint allocation example" in FIG. 27, in each pixel row, a region in which about one sub pixel is arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 27. The position of each opening 551 in one row (the n-th row) of two rows (for example, the n-th row and the (n+1)th row) adjacent to each other in the Y direction is shifted by one sub pixel in the positive X direction from the position of the corresponding opening 551 in the other row (the (n+1)th row). Specifically, the light-shielding regions of the light-shielding barrier 55 are disposed in a staggered pattern. The openings 551 are disposed in a staggered pattern.

With such allocation of pixel signals to sub pixels, a row in which the fourth sub pixels Wpix are visually recognizable and a row in which the second sub pixels Gpix are visually recognizable are alternately arranged in the Y direction. Although not illustrated, in a visible region made up of sub pixels visually recognizable at a first viewpoint as the other of the two viewpoints, a row in which the first sub pixels Rpix are visually recognizable and a row in which the third sub pixels Bpix are visually recognizable are alternately arranged in the Y direction. Thus, in the 2×2-sub-pixel/two-viewpoint case described above with reference to FIG. 27, only two kinds of sub pixels among the four kinds of sub pixels in colors are visually recognizable at any viewpoint.

Thus, when the 2×2-sub-pixel/two-viewpoint case is assumed, it is possible to allow all sub pixels to be visually recognizable at each viewpoint by assuming a virtual third person and allocating pixel signals to sub pixels so that individual images are output to three viewpoints.

FIG. 28 is a diagram illustrating a pixel signal allocation example in a 2×2-sub-pixel/three-viewpoint case and a visible region made up of sub pixels visually recognizable at a second viewpoint as one of the three viewpoints. In the "2×2-sub-pixel/three-viewpoint allocation example" in FIG. 28, three sub pixels arranged in the X direction in each row are sub pixels "1", "2", and "3". Such a pattern is formed that the periodical arrangement of sub pixels in the order of "1", "2", and "3" is repeated from the one side in the X direction toward the other side.

In "2×2-sub-pixel/three-viewpoint allocation example" in FIG. 28, sub pixels "1", "3", and "2" are periodically arranged in the Y direction in this order from the one end side toward the other end side in a column in which a sub pixel "1" is positioned at the one end of the column. Sub pixels "2", "1", and "3" are periodically arranged in the Y direction in this order from the one end side toward the other end side in a column in which a sub pixel "2" is positioned at the one end of the column. Sub pixels "3", "2", and "1" are periodically arranged in the Y direction in this order from the one end side toward the other end side in a column in which a sub pixel "3" positioned at the one end of the column.

In the arrangement of the openings 551 of the light-shielding barrier 55 provided with an assumption of the "2×2-sub-pixel/three-viewpoint allocation example" in FIG. 28, in each pixel row, a region in which about two sub pixels are arranged in the X direction is covered by the light-shielding barrier 55, a region in which one sub pixel is disposed in the X direction is formed as an opening 551, and these regions are alternately arranged in the X direction as illustrated in the "second-viewpoint visible region" in FIG. 27. The position of each opening 551 in the middle row (the (n+1)th row) among three rows (for example, the n-th to (n+2)th rows) adjacent to each other in the Y direction is shifted by one sub pixel in the positive X direction from the position of the corresponding opening 551 in one row (n-th row) of two rows facing each other in the Y direction with the middle row interposed therebetween. The position of each opening 551 in the middle row (the (n+1)th row) is shifted by one sub pixel in the negative X direction the position of the corresponding opening 551 in the other row (the (n+2)th row) of the two row facing each other in the Y direction with the middle row interposed therebetween.

With such combination of the allocation of pixel signals to sub pixels and the arrangement of the openings 551 of the light-shielding barrier 55, each row includes the fourth sub pixel Wpix, the second sub pixel Gpix, the third sub pixel Bpix, and the first sub pixel Rpix as illustrated in the "second-viewpoint visible region" in FIG. 28. In this manner, even when two persons are assumed to be users who visually recognize individual images, it is possible to allow all sub pixels to be visually recognizable at each viewpoint by allocating pixel signals with an assumption of a third viewpoint.

The stacking order of the components described above with reference to FIG. 1 is merely exemplary and the present disclosure is not limited thereto, and for example, the color filter layer CF and the black matrix BM may be provided on the first substrate 51 side. The following describes such a configuration with reference to FIG. 29.

Figure 29:
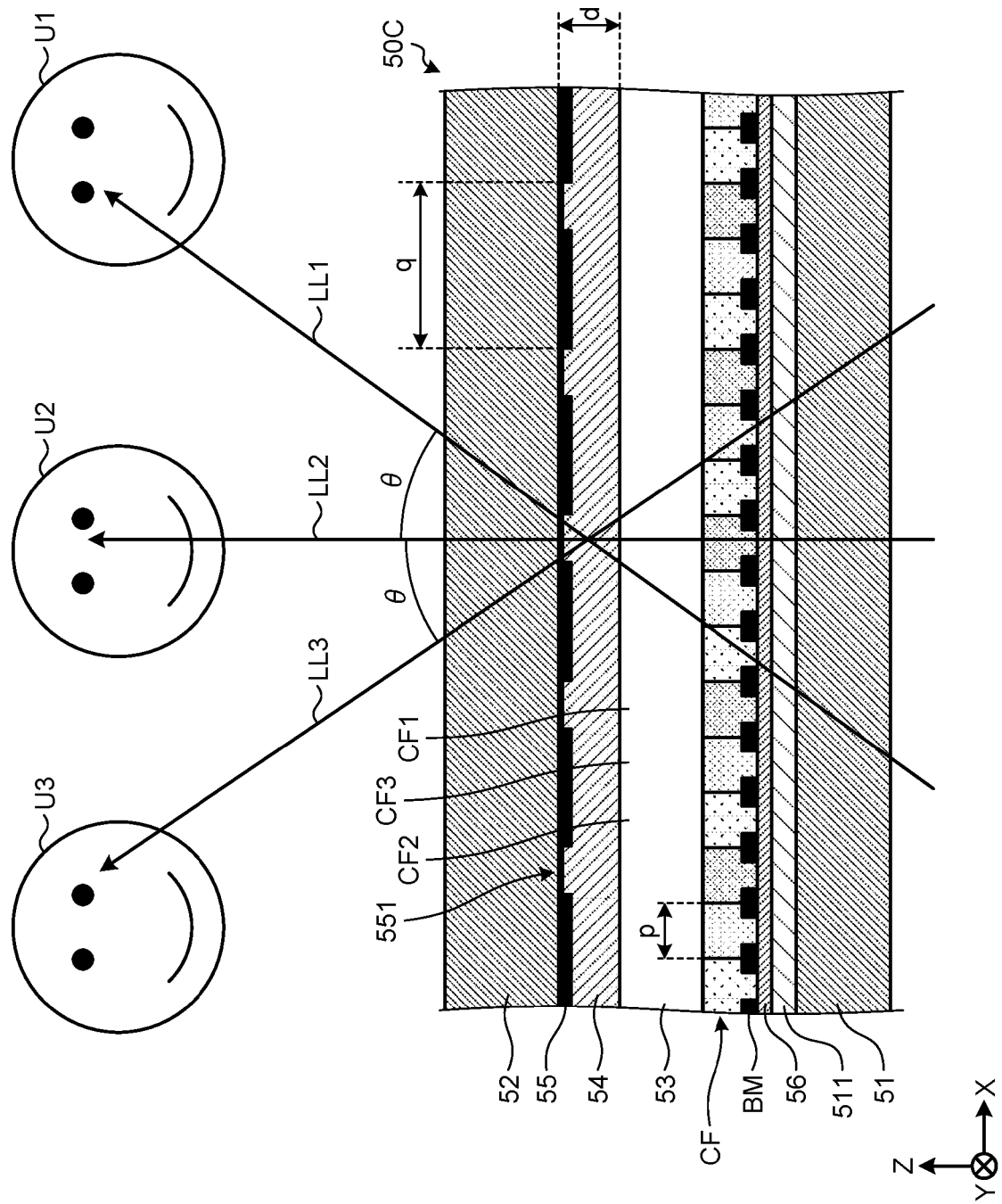
FIG. 29 is a sectional view illustrating a main configuration of a display device in which a color filter layer and a black matrix are provided on a first substrate side.

FIG. 29 is a sectional view illustrating a main configuration of a display device 50C in which the color filter layer CF and the black matrix BM are provided on the first substrate 51 side. As illustrated in FIG. 29, between the first substrate 51 and the liquid crystal layer 53 in the display device 50C, the OC layer 56, the black matrix BM, and the color filter layer CF are stacked from the first substrate 51 side toward the liquid crystal layer 53 side. No other component is provided between the liquid crystal layer 53 and the resin layer 54 in the display device 50C. In this case, the distance d does not include the thickness of the color filter layer CF in the Z direction and is equal to the thickness of the resin layer 54 in effect.

The structure for sealing the liquid crystal layer 53 at an end part of the display device 50C in plan view may be any of the structures described above with reference to FIGS. 2 to 4 or may be any other structure. The structure for sealing the liquid crystal layer 53 at an end part of the display device 50 in plan view may be any other structure different from those described above with reference to FIGS. 2 to 4.

As described above, according to the embodiment and the modifications, a display device (for example, the display device 50, 50A, 50B, or 50C) is capable of outputting individual images to a plurality of viewpoints (for example, the viewpoints U1, U2, and U3) arranged in a predetermined direction (for example, the X direction). The display device includes: two light-transmitting substrates (the first substrate 51 and the second substrate 52) that face each other with a liquid crystal layer (the liquid crystal layer 53) interposed therebetween; a resin layer (the resin layer 54) that is a light-transmitting layer and stacked between the liquid crystal layer and one substrate (the second substrate 52) positioned on a user side (for example, a side closer to the viewpoints U1, U2, and U3) of the two light-transmitting substrates; and a light-shielding barrier (the light-shielding barrier 55) provided between the one substrate and the resin layer and having a plurality of openings (the openings 551). With this configuration, the thickness of any component interposed between the light-shielding barrier and the liquid crystal layer can be set depending on the thickness of the resin layer, and the thickness of the component can be prevented from being affected by the thicknesses of the two light-transmitting substrates. Thus, the distance between the liquid crystal layer and the light-shielding barrier can be more easily set to a desired thickness.

The thickness of the resin layer (resin layer 54) is based on a first condition and a second condition. The first condition is an angle (the angle θ) formed between the line of light passing through one of the openings (openings 551) and reaching one of two viewpoints adjacent to each other in the predetermined direction (X direction) and the line of light passing through the opening and reaching the other of the two viewpoints adjacent to each other in the predetermined direction. The second condition is the arrangement pitch (sub-pixel pitch p) of color filters (for example, the first color filter CF1, the second color filter CF2, and the third color filter CF3) in the predetermined direction, the color filers being individually provided for a plurality of respective sub pixels included in the display device. With this configuration, the thickness of the resin layer can be more appropriately determined.

When the color filters (for example, the first color filter CF1, the second color filter CF2, and the third color filter CF3) are disposed between the liquid crystal layer (liquid crystal layer 53) and the resin layer (resin layer 54), the thickness of the resin layer corresponds to a thickness obtained by subtracting the thickness of each color filter from a thickness calculated based on the first condition and the second condition described above. Thus, the thickness of the resin layer can be more appropriately determined.

The color filters (for example, the first color filter CF1, the second color filter CF2, and the third color filter CF3) may be disposed on the other (first substrate 51) of the two light-transmitting substrates. In this manner, the configuration of the present disclosure provides flexibility to the arrangement of the color filters.

The greatest common divisor of the number of kinds of the sub pixels (for example, one or more of the first sub pixel Rpix, the second sub pixel Gpix, the third sub pixel Bpix, and the fourth sub pixel Wpix) and the number of images simultaneously output in accordance with the number of the viewpoints (for example, the viewpoints U1, U2, and U3) is one only. Thus, all kinds of sub pixels can be easily made visually recognizable at each viewpoint. Moreover, all kinds of sub pixels can be easily included in each row.

The sub pixels adjacent to each other in the predetermined direction (X direction) are used for outputting of respective images to different viewpoints. Thus, the openings (openings 551) can be disposed with higher definition.

In the embodiment and the modifications, the number of individual output images (the total number of viewpoints including the number of viewpoints of users who actually visually recognize the images and the number of virtual viewpoints), the angle (angle θ) between the viewpoints, and the arrangement pitch (sub-pixel pitch p) of sub pixels in the X direction are determined in advance at the timing of designing. Specifically, the distance d may be determined in advance in accordance with designing. In addition, the arrangement of the light-shielding barrier 55 and the openings 551 in plan view is determined at the timing of designing as well. Thus, which sub pixels are to be used for image outputting to which viewpoints may be determined in advance at the timing of designing. As exemplified in, for example, the second and third modifications, a visible region can be changed in accordance with image outputting. For example, in a state in which the viewpoint U3 corresponds to observation from a position further on the side than in the example illustrated in FIG. 1, in other words, a state in which the angle θ is larger than, a visible region at the viewpoint U3 can be increased by, for example, setting the angle ranges A3a and A3b as in the third modification. For example, in a state in which external light appears bright on the display surface at night and interferes with image visual recognition, sub pixels may be allocated to outputting of black as in the "black-outputting allocation example" in FIG. 17. Such output change in accordance with a state can be achieved by controlling operation of the display device in accordance with outputs from various sensors provided to detect a state around the display device. Thus, "which sub pixels are to be used for image outputting to which viewpoints" does not necessarily need to be determined at the timing of designing of the display device.

The common electrode of the display device 50 described above is included in the circuit formation layer 511 but may be provided on the second substrate 52 side.

It should be understood that the present disclosure provides any other effects achieved by aspects described above in the embodiment and the modifications, such as effects that are clear from the description of the present specification or effects that could be thought of by the skilled person in the art as appropriate.

What is claimed is:

1. A display device capable of outputting individual images to a plurality of viewpoints arranged in a predetermined direction, the display device comprising:
   two light-transmitting substrates that face each other with a liquid crystal layer interposed therebetween;
   color filters arranged in the predetermined direction;
   a black matrix disposed on boundaries of the color filters, the black matrix having BM portions each overlapping a corresponding one of the boundaries of the color filters;
   a resin layer that is a light-transmitting layer and stacked between the liquid crystal layer and one substrate of the two light-transmitting substrates, the one substrate being positioned on a user side of the two light-transmitting substrates; and
   a light-shielding barrier provided between the one substrate and the resin layer and having a plurality of openings and barrier portions disposed adjacent to at least one of the openings in the predetermined direction,
   wherein one of the barrier portions overlaps corresponding ones of the BM portions that are disposed in a layer different from a layer of the barrier portions, in plan view, and
   the one substrate, the light-shielding barrier, the resin layer, the black matrix, and the color filters are stacked in an order as listed.

2. The display device according to claim 1, wherein
   the thickness of the resin layer is based on a first condition and a second condition,
   the first condition is an angle formed between a line of light passing through one of the openings and reaching one of two viewpoints adjacent to each other in the predetermined direction and a line of light passing through the opening and reaching the other of the two viewpoints adjacent to each other in the predetermined direction, and
   the second condition is an arrangement pitch of the color filters in the predetermined direction, the color filters being individually provided for a plurality of respective sub pixels included in the display device.

3. The display device according to claim 2, wherein
   the color filters are disposed between the liquid crystal layer and the resin layer, and
   the thickness of the resin layer corresponds to a thickness obtained by subtracting the thickness of each color filter from a thickness calculated based on the first condition and the second condition.

4. The display device according to claim 2, wherein the color filters are disposed on an other substrate of the two light-transmitting substrates, the other substrate being positioned on an opposite side of the user side.

5. The display device according to claim 2, wherein the greatest common divisor of the number of kinds of the sub pixels and the number of images simultaneously output in accordance with the number of the viewpoints is one only.

6. The display device according to claim 5, wherein the sub pixels adjacent to each other in the predetermined direction are used for outputting of respective images to different viewpoints.

7. The display device according to claim 1, wherein a length of each of the barrier portions in the predetermined direction is greater than a length of each of the BM portions in the predetermined direction.

8. The display device according to claim 1, wherein
a length of each of the barrier portions in the predetermined direction is greater than a length of each of the color filters in the predetermined direction.

9. The display device according to claim 1, wherein one of the barrier portions having a barrier length overlaps corresponding ones of the BM portions each having a BM portion length that is less than the barrier length, in the predetermined direction.

10. The display device according to claim 1, wherein one of the barrier portions having a barrier length overlaps corresponding ones of the color filters each having a color filter length that is less than the barrier length, in the predetermined direction.

* * * * *